US011390538B2

(12) United States Patent
Eshelman

(10) Patent No.: US 11,390,538 B2
(45) Date of Patent: *Jul. 19, 2022

(54) TURBINE WASTEWATER EVAPORATION SYSTEM

(71) Applicant: WATER EVAPORATION SYSTEMS, LLC, Conroe, TX (US)

(72) Inventor: Bruce Eshelman, Montgomery, TX (US)

(73) Assignee: WATER EVAPORATION SYSTEMS, LLC, Conroe, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/167,432

(22) Filed: Feb. 4, 2021

(65) Prior Publication Data

US 2021/0380436 A1 Dec. 9, 2021

Related U.S. Application Data

(63) Continuation-in-part of application No. 16/896,977, filed on Jun. 9, 2020, now Pat. No. 10,927,026.

(51) Int. Cl.
*C02F 1/04* (2006.01)
*F02C 6/18* (2006.01)
(Continued)

(52) U.S. Cl.
CPC ............ *C02F 1/048* (2013.01); *C02F 1/16* (2013.01); *F02C 6/18* (2013.01); *C02F 2103/10* (2013.01);
(Continued)

(58) Field of Classification Search
CPC ........ C02F 1/048; C02F 1/16; C02F 2103/10; C02F 2201/008; F02C 6/18; C05D 2220/32; C05D 2220/60; C05D 2220/70
See application file for complete search history.

(56) References Cited

U.S. PATENT DOCUMENTS 6,936,140 B2 * 8/2005 Paxton ................ C02F 1/06
 159/901
7,073,337 B2 * 7/2006 Mangin .................. C02F 1/16
 60/783
(Continued)

FOREIGN PATENT DOCUMENTS

WO 2021252284 A1 12/2021

OTHER PUBLICATIONS

USPTO notice of allowance in U.S. Appl. No. 29/737,486, filed Jun. 9, 2020, dated Dec. 14, 2021.
(Continued)

*Primary Examiner* — Jonathan Miller
(74) *Attorney, Agent, or Firm* — Basil M. Angelo; Angelo IP

(57) ABSTRACT

A method and system of wastewater evaporation uses a turbine-based wastewater evaporation system to convert wastewater to steam. The wastewater evaporation system includes a wastewater heating track disposed in the interior of the exhaust collector of the turbine in the flow path of turbine exhaust. The wastewater fluidly communicated therethrough is heated by the turbine exhaust and fluidly communicated to a plurality of atomization nozzles. The plurality of atomization nozzles direct atomized wastewater into the interior of the exhaust port of the turbine that is converted to steam in the presence of turbine exhaust within the exhaust port. The system may be disposed on a mobile trailer or skid to facilitate disposing the system on a job site and may be remotely controllable by a remote operator.

38 Claims, 27 Drawing Sheets

(51) Int. Cl.
*C02F 1/16* (2006.01)
*C02F 103/10* (2006.01)

(52) U.S. Cl.
CPC .... *C02F 2201/008* (2013.01); *F05D 2220/32* (2013.01); *F05D 2220/60* (2013.01); *F05D 2220/70* (2013.01)

(56) References Cited

U.S. PATENT DOCUMENTS

| | | | | |
|---|---|---|---|---|
| 8,679,291 | B2* | 3/2014 | Duesel, Jr. | B01D 1/305 210/768 |
| 8,801,897 | B2* | 8/2014 | Duesel, Jr. | C02F 1/10 203/28 |
| 9,770,671 | B2* | 9/2017 | Curlett | B01D 1/14 |
| 10,441,894 | B2* | 10/2019 | Curlett | B01D 47/14 |
| 10,927,026 | B1* | 2/2021 | Eshelman | C02F 1/12 |
| 2006/0000355 | A1* | 1/2006 | Ogura | C02F 1/265 95/224 |
| 2007/0101703 | A1* | 5/2007 | Kanaya | B01D 53/9431 60/286 |
| 2011/0140457 | A1* | 6/2011 | Lakatos | C02F 1/12 210/639 |
| 2011/0147195 | A1* | 6/2011 | Shapiro | C02F 1/441 203/10 |
| 2015/0157953 | A1* | 6/2015 | Duesel, Jr. | C02F 1/18 55/423 |
| 2016/0096743 | A1* | 4/2016 | Duesel, Jr. | C02F 1/042 159/47.3 |

OTHER PUBLICATIONS

Applicant reply to USPTO office action dated Jul. 28, 2020 in U.S. Appl. No. 16/896,977, filed Jun. 9, 2020, reply filed on Oct. 22, 2020.

Unknown author, Gas Fuel Metering Valve AGV10 for Light Industrial Gas Turbines, date of publication unknown, obtained from http://continentalcontrols.com/temp/literature/pdf/AGV%2010%20Revised.pdf on Jun. 8, 2020.

Unknown author, Solar Turbines Incorporated, Solar Saturn Gas Turbine Generator Drive Application Control Package, date of publication unknown, obtained from https://petrotechinc.com/literature-library-files/gas-steam-turbines/solar-saturn-generator.pdf on Jun. 8, 2020.

Unknown author, Solar Turbines Incorporated, Turbomachinery Package Specification Saturn 20 Compressor Set and Mechanical Drive, 2009, obtained from https://pdf.directindustry.com/pdf/solar-turbines/saturn-20-cs-md-turbomachinery-package-specification/22650-199745.html on Jun. 8, 2020.

Unknown author, United States Environmental Protection Agency, Summary of Input on Oil and Gas Extraction Nastewater Management Practices Under the Clean Water Act, EPA-821-S19-001, May 2020, obtained from https://www.epa.gov/sites/production/files/2020-05/documents/oil-gas-final-report-2020.pdf on Jun. 8, 2020.

Unknown author, Valve Automation, Pneumatic Actuator HP-Series, date of publication unknown, obtained from ntps://www.meerza.com.my/wp-content/uploads/2016/08/HP-Catalog.pdf on Jun. 8, 2020.

USPTO non-final office action issued in U.S. Appl. No. 16/896,977, filed Jun. 9, 2020, dated Jul. 28, 2020.

USPTO notice of allowance in U.S. Appl. No. 16/896,977, filed Jun. 9, 2020, dated Oct. 30, 2020.

Applicant reply to USPTO Office Action dated Sep. 24, 2021, issued in U.S. Appl. No. 29/737,486, filed Jun. 9, 2020, reply dated Oct. 13, 2021.

PCT International Search Report of the International Search Authority (USPTO) for PCT/US2021/035910, filed on Jun. 4, 2021, dated Jul. 2, 2021.

PCT Written Opinion of the International Search Authority (USPTO) for PCT/US2021/035910, filed on Jun. 4, 2021, dated Jul. 2, 2021.

USPTO non-final office action issued in U.S. Appl. No. 29/737,486, filed Jun. 9, 2020, dated Sep. 24, 2021.

* cited by examiner

SECTION A-A

SECTION A-A

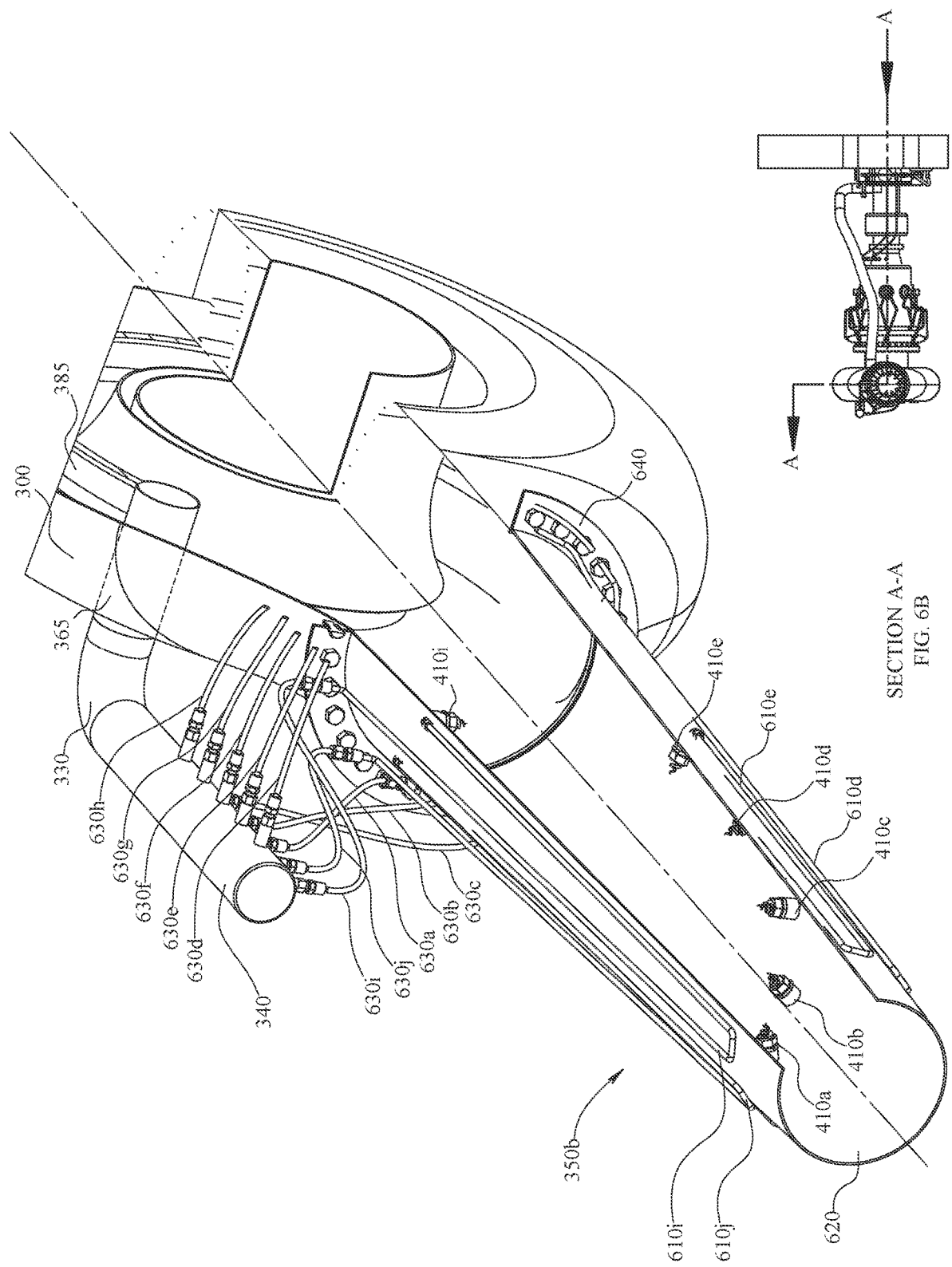

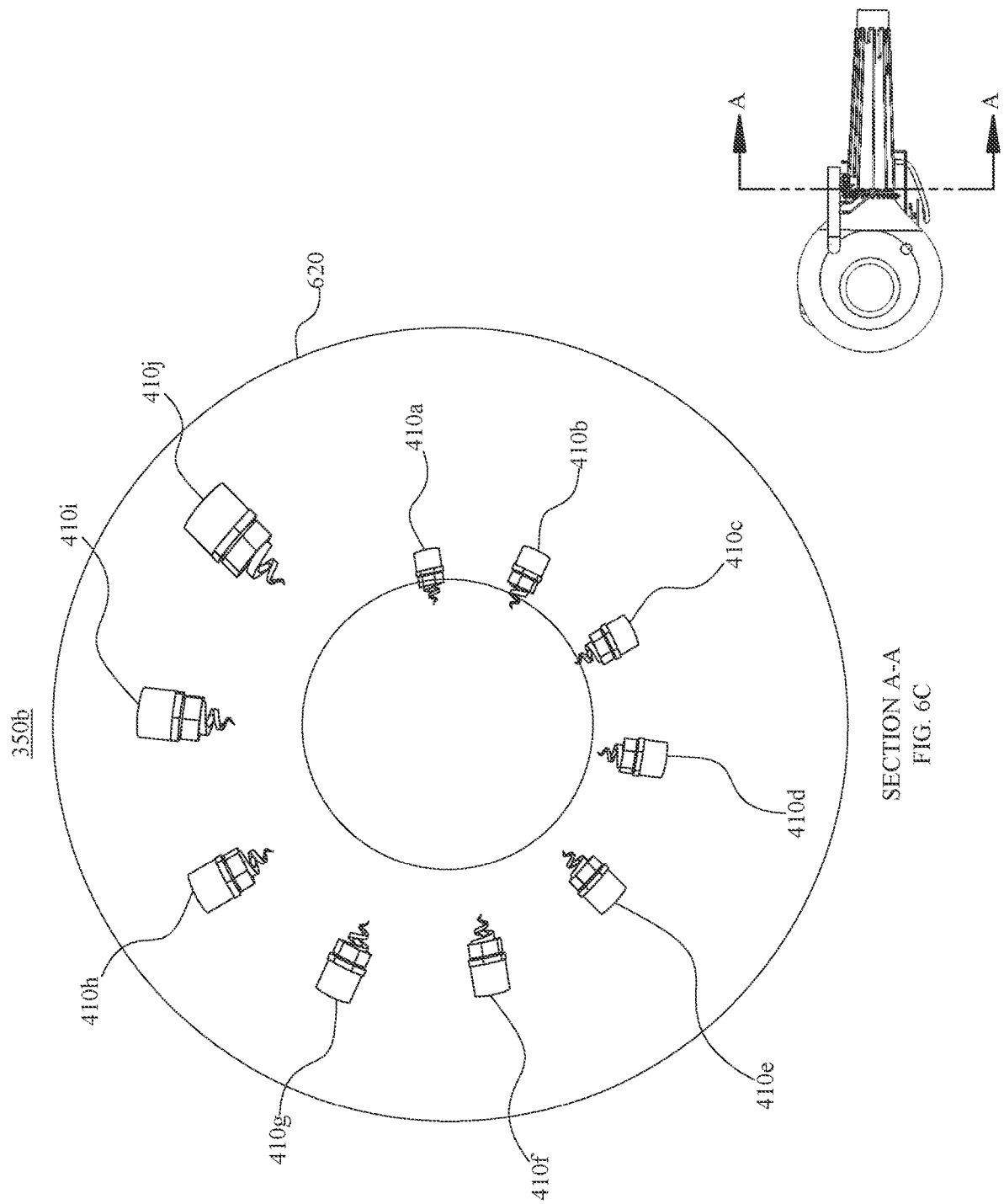

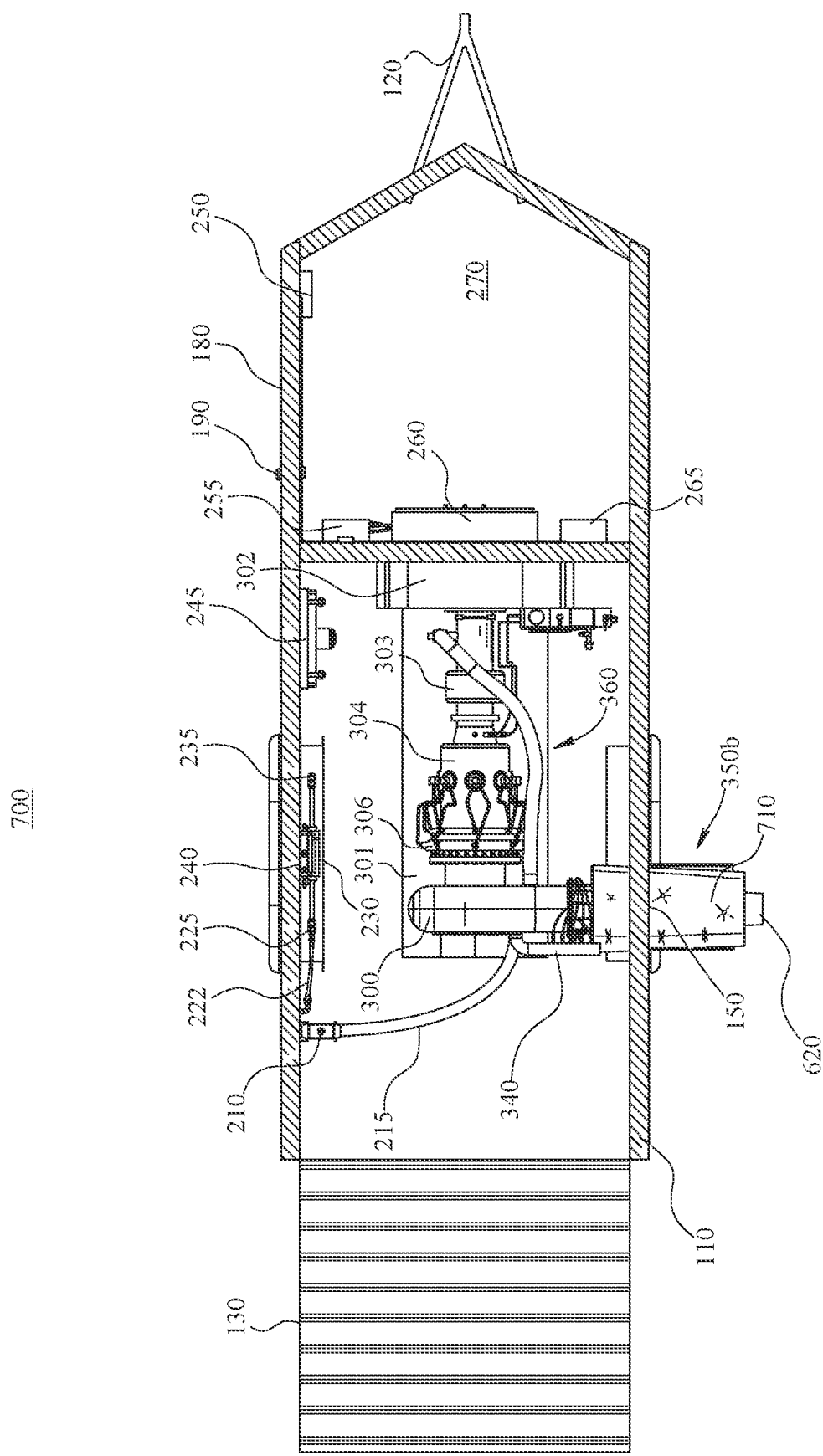

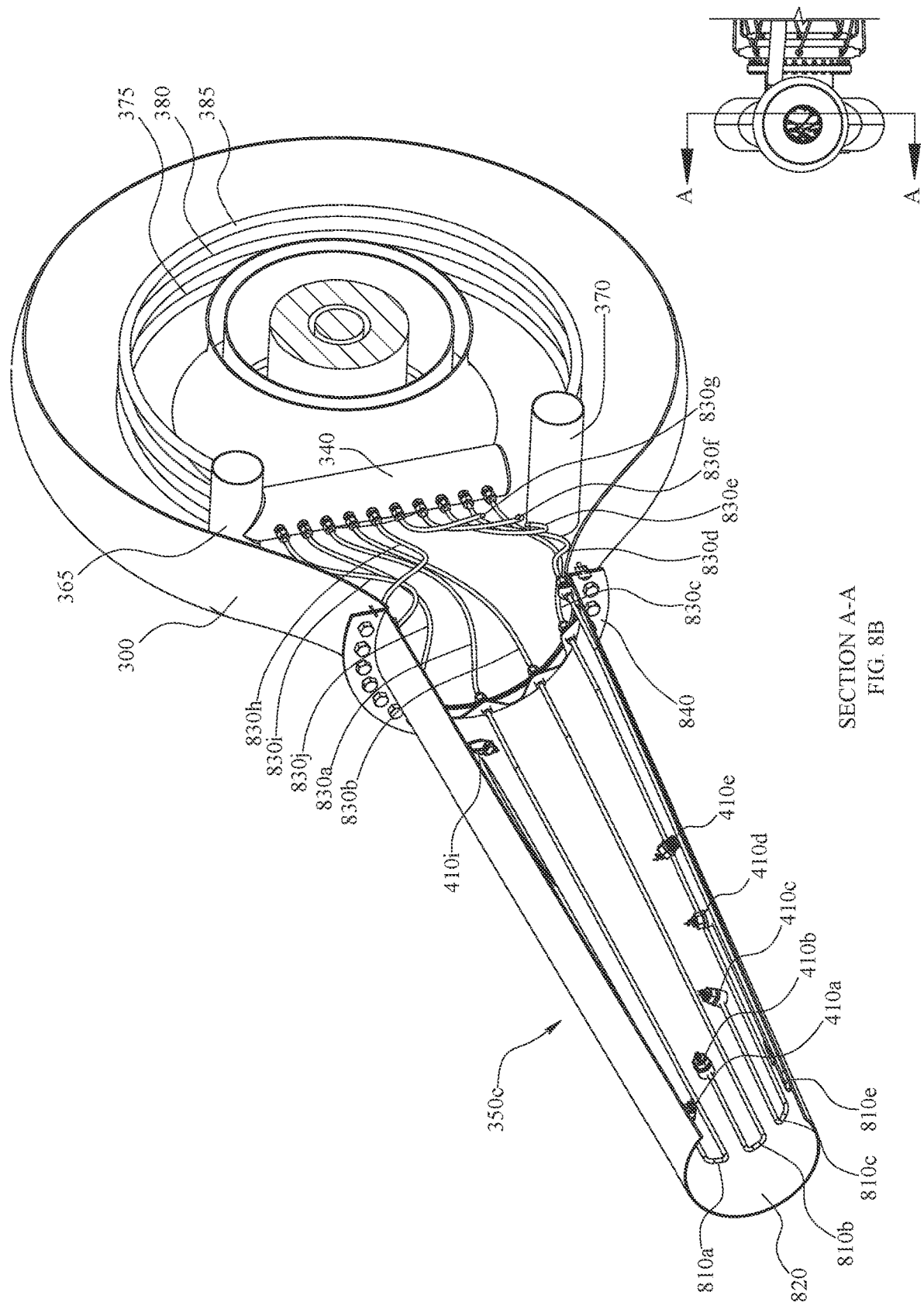

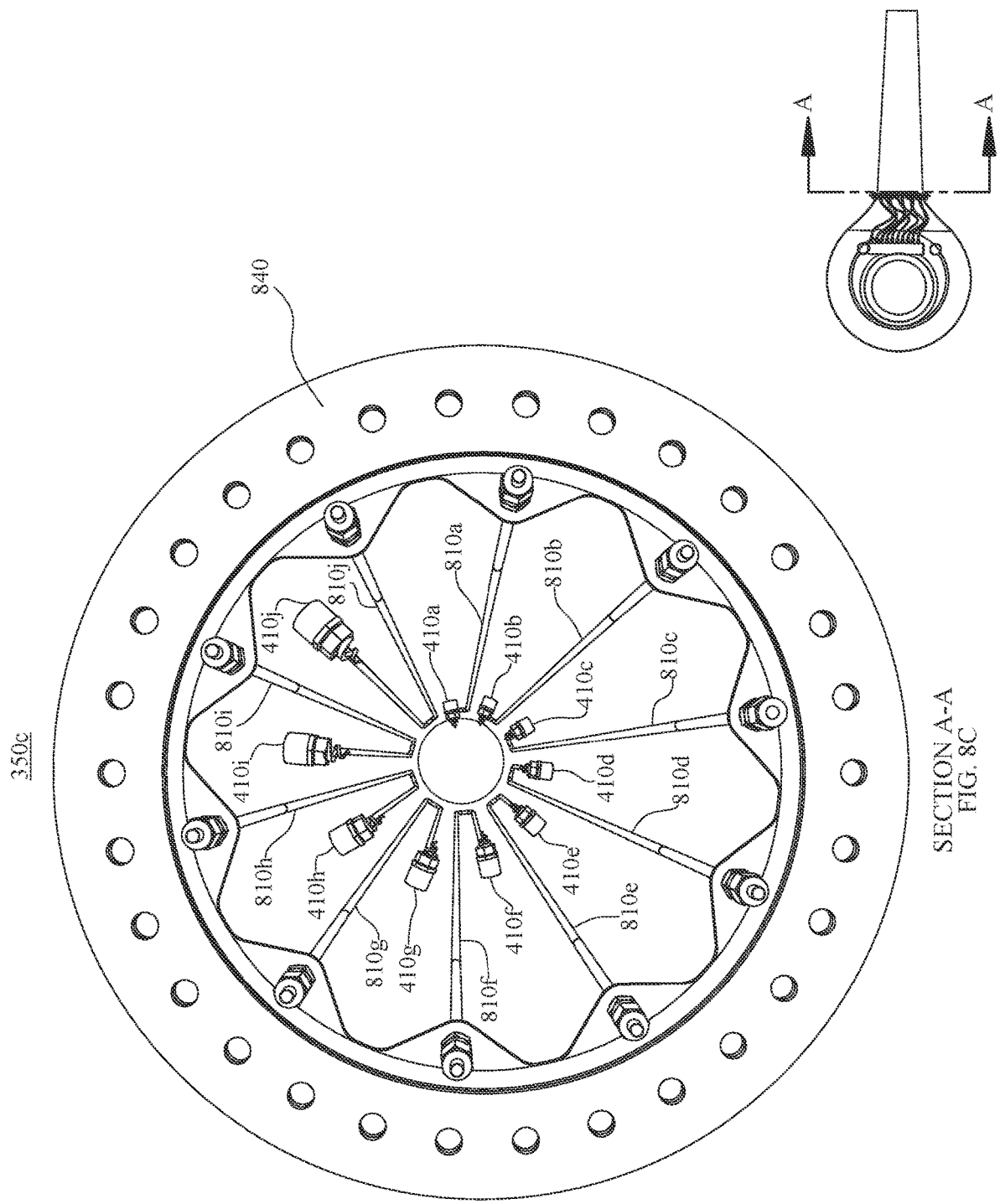

TURBINE WASTEWATER EVAPORATION SYSTEM

CROSS-REFERENCE TO RELATED APPLICATIONS

This application is a continuation-in-part of U.S. patent application Ser. No. 16/896,977, filed on Jun. 9, 2020, which is hereby incorporated by reference in its entirety.

BACKGROUND OF THE INVENTION

Hydraulic fracturing, commonly referred to as fracking, is a well-stimulation technique that fractures bedrock formations under high pressure to provide access to hydrocarbons disposed therein. Fracking is typically performed in formations composed of low permeability rock such as shale, sandstone, and sometimes coal. Fracking fluids are typically composed of water and one or more of sand, additives, and proppants that are injected into the formation under high pressure to create or enhance cracks in the bedrock formation to gain access to hydrocarbons. Shale reserves in the United State are believed to account for more than 80% of the world's total reserves and represent a staggering 5 trillion barrels of oil. As such, there has been a dramatic increase in domestic fracking operations and a corresponding increase in the volume of produced water, often referred to as wastewater, that must be properly disposed of. During fracking or conventional drilling processes, the majority of fluid returns, by volume, are wastewater. The returning water is separated from the hydrocarbons and solids and is either recycled for reuse or disposed of. During production operations, of a fractured or conventional well, there is also a substantial amount of wastewater. The ratio of wastewater to produced oil may be as high as 100 to 1 depending on the well, however, in the Permian Basin, 2 to 3 gallons of wastewater are typically produced for every gallon of oil produced. While the total volume of wastewater produced is not known, fracking is believed to produce billions of gallons of wastewater each and every year that requires disposal in accordance with the law.

BRIEF SUMMARY OF THE INVENTION

According to one aspect of one or more embodiments of the present invention, a method of wastewater evaporation using a turbine includes fluidly communicating wastewater through a wastewater heating track disposed within an interior of an exhaust collector of the turbine, where the wastewater is heated by turbine exhaust in the interior of the exhaust collector while being fluidly communicated, and fluidly communicating the wastewater from the wastewater heating track to a plurality of wastewater atomization nozzles disposed at least partially within an interior of an exhaust port of the turbine, where the wastewater atomization nozzles direct atomized wastewater into the interior of the exhaust port. The atomized wastewater is converted into steam in the presence of turbine exhaust within the exhaust port.

According to one aspect of one or more embodiments of the present invention, a wastewater evaporation system includes a turbine having an exhaust collector and an exhaust port, a wastewater heating track having a track inlet, a track outlet, and one or more wastewater pipe segments that fluidly connect the track inlet to the track outlet, where the wastewater heating track is disposed within an interior of the exhaust collector of the turbine, and a plurality of wastewater atomization nozzles fluidly connected to the track outlet of the wastewater heating track that are at least partially disposed within an interior of the exhaust port of the turbine.

According to one aspect of one or more embodiments of the present invention, a mobile wastewater evaporation system includes a mobile trailer, a turbine having an exhaust collector and an exhaust port, a wastewater heating track having a track inlet, a track outlet, and one or more wastewater pipe segments that fluidly connect the track inlet to the track outlet, where the wastewater heating track is disposed within an interior of the exhaust collector of the turbine, a plurality of wastewater atomization nozzles fluidly connected to the track outlet of the wastewater heating track that are at least partially disposed within an interior of the exhaust port of the turbine, and a control system that controls operation of the turbine.

Other aspects of the present invention will be apparent from the following description and claims.

BRIEF DESCRIPTION OF THE DRAWINGS

FIG. 6B shows a cross-sectional perspective view of a portion of an exhaust port with a plurality of exhaust port piping disposed about an exterior surface of the exhaust port and a turbine exhaust collector in accordance with one or more embodiments of the present invention.

FIG. 6C shows a cross-sectional view through an interior portion of an exhaust port with a plurality of exhaust port piping disposed above an exterior surface of the exhaust port in accordance with one or more embodiments of the present invention.

FIG. 7A shows a top interior plan view of a mobile wastewater evaporation system with an exhaust port with a plurality of exhaust port piping disposed about an exterior surface of the exhaust port in accordance with one or more embodiments of the present invention.

FIG. 8B shows a cross-sectional perspective view of a portion of an exhaust port with a plurality of exhaust port piping disposed about an interior surface of the exhaust port and a turbine exhaust collector in accordance with one or more embodiments of the present invention.

FIG. 8C shows a cross-sectional view through an interior portion of an exhaust port with a plurality of exhaust port piping disposed above an interior surface of the exhaust port in accordance with one or more embodiments of the present invention.

DETAILED DESCRIPTION OF THE INVENTION

Figure 1A:
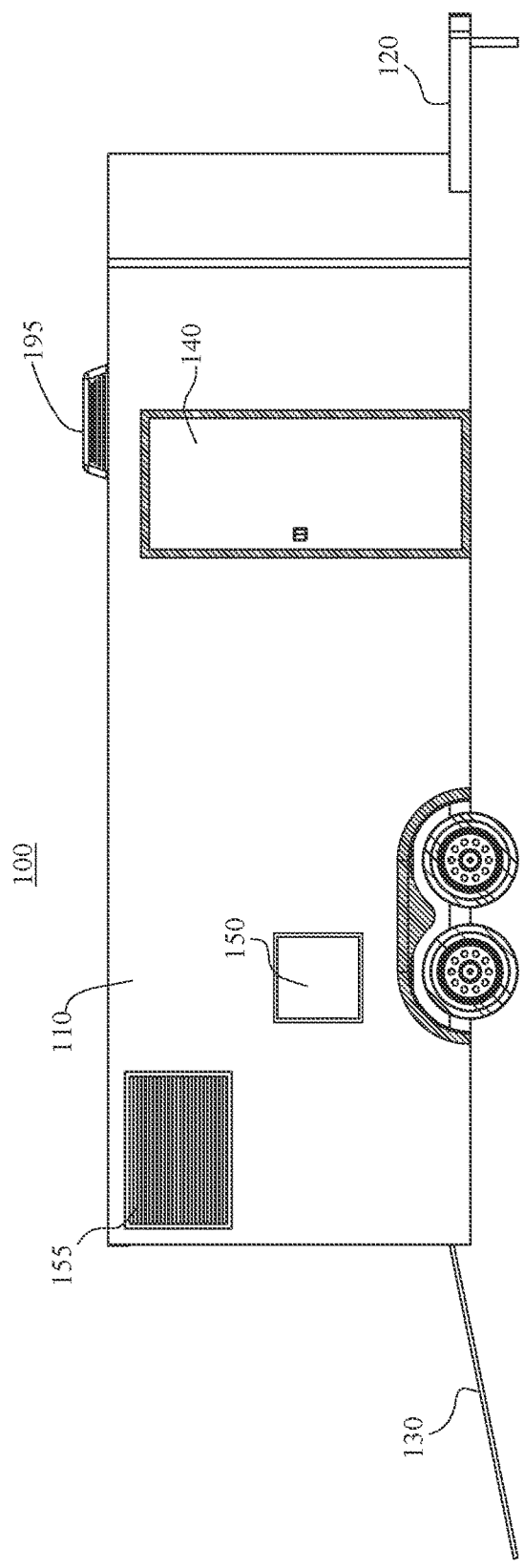
FIG. 1A shows a left-side exterior elevation view of a mobile wastewater evaporation system in accordance with one or more embodiments of the present invention.

One or more embodiments of the present invention are described in detail with reference to the accompanying figures. For consistency, like elements in the various figures are denoted by like reference numerals. In the following detailed description of the present invention, specific details are set forth to provide a thorough understanding of the present invention. In other instances, well-known features to those of ordinary skill in the art are not described to avoid obscuring the description of the present invention.

A longstanding issue in the oil and gas industry is how to properly dispose of significant volumes of wastewater in accordance with law. For the purpose of this disclosure, wastewater means any water produced as part of fracking or conventional drilling operations, sometimes referred to in the industry as flowback water, and any water produced as part of production operations, sometimes referred to in the industry as produced water. However, one of ordinary skill in the art will recognize that wastewater may refer to any water that requires disposal, including wastewater produced by other applications outside of the oil and gas industry, in accordance with one or more embodiments of the present invention. The vast majority of wastewater produced as part of exploration and production operations is disposed of by injecting it underground in an off-site disposal well. The wastewater is typically transported by pipeline or truck to an off-site location where it is injected deep underground in a dedicated disposal well. However, underground injection is not geologically feasible in all areas and remains controversial for a number of reasons. The chemistry of produced wastewater is not well characterized, varies from well to well, and injection underground potentially contaminates or fouls other water resources. In addition, there is evidence that injection contributes to increased seismic activity causing earthquakes in areas where earthquakes are not normally experienced. Alternatively, wastewater is transferred off-site and disposed of by a wastewater disposal facility that serves as a centralized disposal site. The wastewater is typically transported by pipeline or truck to the wastewater disposal facility where the wastewater is treated and recycled for reuse in drilling operations or treated for industrial, agricultural, or municipal use. Some wastewater disposal facilities dispose of wastewater through evaporation, discharge over surface wasters, or underground injection into disposal wells.

As such, the current state of the art in the oil and gas industry is to dispose of wastewater off site, incurring costs for intermediate on-site storage, pipeline, or trucking resources to transport the wastewater off-site, off-site storage, and off-site disposal, the costs of which may vary depending on the volume, distances involved, and means of disposal. Because of the volume of wastewater produced, these costs are substantial, increase the overall cost of operations, and are a factor in the economic feasibility of operations. In an oil and gas industry that has and continues to experience significant pricing pressure, costs must be controlled in order to make the exploration and production of hydrocarbons not only economically feasible, but competitive and profitable. While pricing of produced oil is beyond the control of operators and drillers, the ability to control costs, including those related to the disposal of wastewater, is critical to the economic feasibility of ongoing exploration and production operations.

Accordingly, in one or more embodiments of the present invention a method and system for wastewater evaporation enables the disposal of wastewater on-site at or near the location where the wastewater is produced. A mobile and remotely controllable wastewater evaporation system may be used to evaporate wastewater on location, potentially without on-site personnel, and direct the wastewater steam over an evaporation pond or pit which, upon completion of operations, may be reclaimed in an environmentally conscious manner. Advantageously, the method and system for wastewater evaporation does not require the use of storage, pipeline or trucking resources, or disposal facilities, and potentially does not require on-site personnel, thereby substantially reducing the costs associated with the disposal of produced wastewater and increasing the economic feasibility of operations.

FIG. 1A shows a left-side exterior elevation view of a mobile wastewater evaporation system 100 in accordance with one or more embodiments of the present invention. A mobile wastewater evaporation system 100 may include an integrated or towable housing that facilitates locating a wastewater evaporation system (not shown) on-site to dispose wastewater at or near the location where it is being produced. In certain embodiments, the mobile wastewater evaporation system 100 may include a mobile trailer 110 that houses components of the wastewater evaporation system (not shown). The mobile trailer 110 may include a trailer hitch 120 that permits the mobile trailer 110 to be towed onto the job site by a light duty truck and, in certain embodiments, be left on site for remote operation. Notwithstanding, one of ordinary skill in the art will recognize that any type or kind of mobile housing, integrated with a vehicle or capable of being towed onto or disposed on the job site, may be used in accordance with one or more embodiments of the present invention. Mobile trailer 110 may further include a rear-access ramp 130 that facilitates access to a turbine area (not shown) of the mobile trailer 110 and a side-access door 140 that facilitates access to an interior of the mobile trailer 110 (in certain embodiments, to a control room (not shown) of the mobile wastewater evaporation system 100). Mobile trailer 110 may further include an exhaust window 150 for discharging turbine exhaust and wastewater steam (not shown), an exhaust fan 155 to exhaust the turbine area (not shown) of the mobile trailer 110, and an optional air conditioner 195.

Figure 1B:
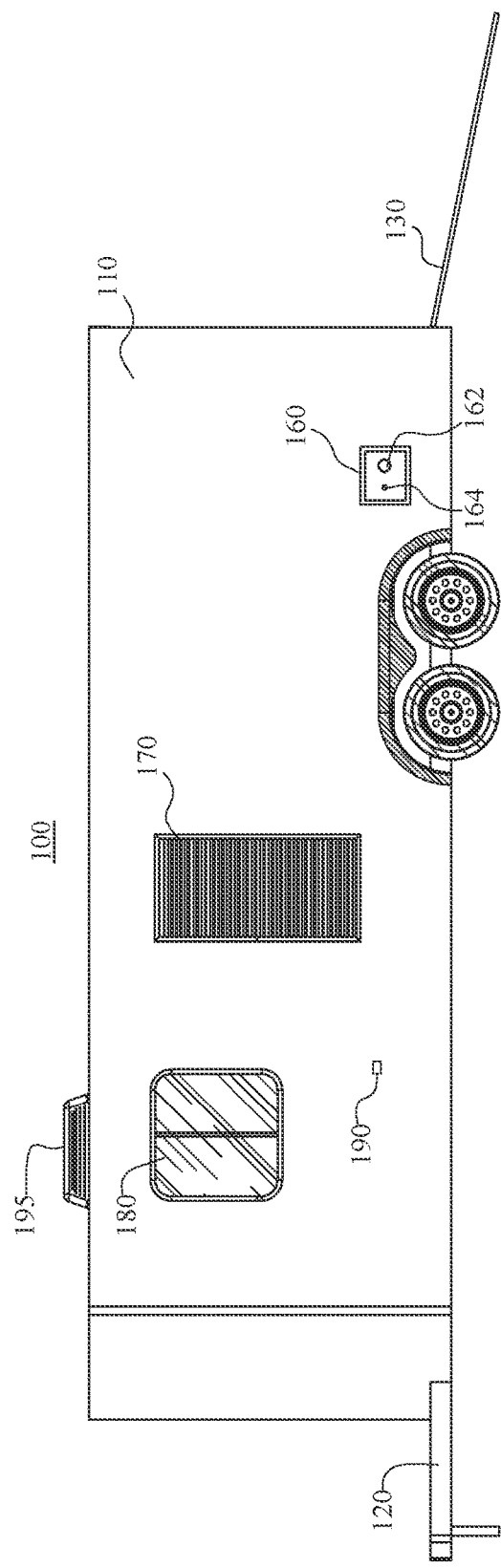
FIG. 1B shows a right-side exterior elevation view of a mobile wastewater evaporation system in accordance with one or more embodiments of the present invention.

Continuing, FIG. 1B shows a right-side exterior elevation view of a mobile wastewater evaporation system 100 in accordance with one or more embodiments of the present invention. Mobile trailer 110 may further include a connection interface 160 panel to facilitate external connections to the system 100. Connection interface 160 may include an exterior wastewater inlet connector 162 for connecting an exterior wastewater hose (not shown) that fluidly communicates wastewater to the system 100 and an exterior fuel inlet connector 164 for connecting an exterior fuel hose (not shown) that fluidly communicates fuel to the turbine system (not shown). Mobile trailer 110 may further include an oil cooling system 170 that cools the oil used to lubricate the turbine system (not shown). The optional control room (not shown) or turbine area (not shown) of mobile trailer 110 may include one or more windows 180. In the embodiment depicted, window 180 is disposed on the same side as the connection interface 160 such that an operator in the optional control room (not shown) may have visibility to the source of wastewater via wastewater inlet connector 162 or fuel via fuel inlet connector 164. Mobile trailer 110 may further include one or more electrical interfaces 190 that either input electrical power to the control systems (not shown) of the system 100 or provide an outlet for other electrically powered equipment. Notwithstanding, one of ordinary skill in the art will recognize that system 100 may require a source of electrical power, either via connection interface 190 or otherwise, that powers the control systems (not shown) that operate the turbine (not shown) of the mobile wastewater evaporation system 100. One of ordinary skill in the art will appreciate that the placement and location of vents, portals, windows, fans, doors, and ramps may vary based on an application or design in accordance with one or more embodiments of the present invention.

Figure 2A:
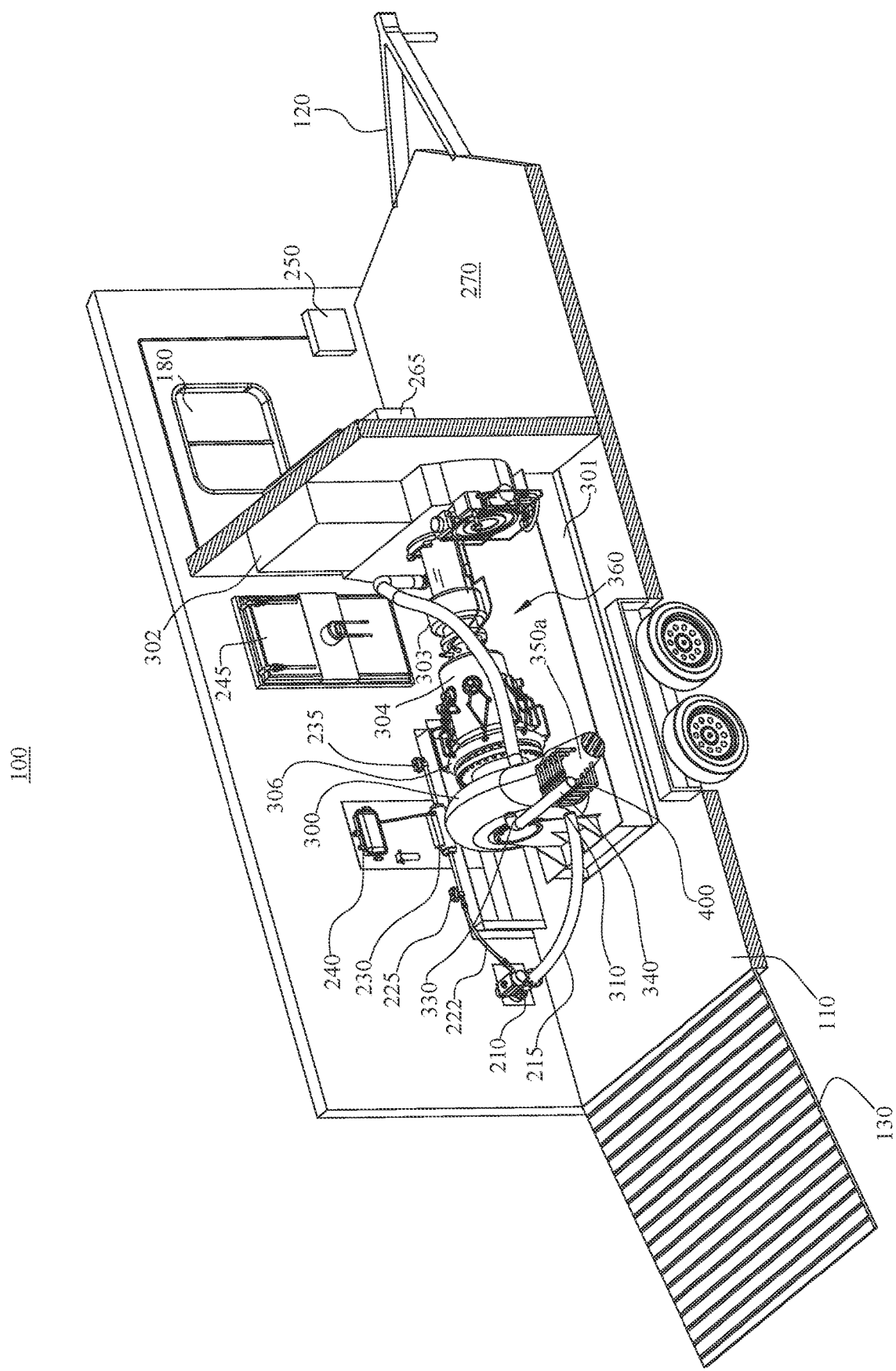
FIG. 2A shows a left-side rear-facing interior perspective view of a mobile wastewater evaporation system in accordance with one or more embodiments of the present invention.

FIG. 2A shows a left-side rear-facing interior perspective view of a mobile wastewater evaporation system 100 in accordance with one or more embodiments of the present invention. Mobile wastewater evaporation system 100 may be disposed in a mobile trailer 110 that facilitates locating the system 100 on a desired job site. Mobile trailer 110 may house a wastewater evaporation turbine system 360 and may optionally include a control room 270 that houses equipment used to control the operation of the mobile wastewater evaporation system 100.

In the embodiment shown, the wastewater evaporation turbine system 360 is a Solar® Saturn® gas-fueled turbine modified as discussed herein. While merely exemplary, one of ordinary skill in the art will appreciate that any light industrial gas-fueled turbine system may be used in accordance with one or more embodiments of the present invention. Moreover, one of ordinary skill in the art, having the benefit of this disclosure, will appreciate that the size, type, and kind of turbine system may be modified for a desired application in accordance with one or more embodiments of the present invention. Returning to the figure, the mechanical drive package may include an air intake 302, a compressor 303, a combustor 304, and a turbine drive 306, disposed on a moveable skid 301. The turbine drive 306 typically includes two or three turbine wheels/blades (not shown) that spin as a result of the high temperature and high pressure combustion of the combustor stage 304, drawing more pressurized air into the combustor 304 and spinning an optional generator (not shown) that converts the rotational energy of the turbine wheels (not shown) into electrical energy. In the exemplary Solar® Saturn® gas-fueled turbine modified as discussed herein, the turbine wheels may rotate as high 22,300 times per minute. One or more of the turbine wheels (not shown) may optionally be removed to enhance the generation of heat within the turbine exhaust collector 300. In certain embodiments, the turbine system 360 may be operated with no-load for wastewater evaporation applications. In this context, no-load means the turbine system 360 may be run without a load for the sole purpose of generating hot turbine exhaust that evaporates wastewater. In other embodiments, the turbine system 360 may generate electrical power that may be used to at least partially power the electrically powered components of the system 100. In still other embodiments, the turbine system 360 may be configured for use with any other type or kind of turbine-driven load. One of ordinary skill in the art, having the benefit of this disclosure, will recognize that wastewater evaporation turbine system 360 may be any type or kind of industrial turbine having a turbine exhaust collector 300 capable of housing a wastewater heating track (not shown) within the turbine exhaust collector 300.

An exterior fuel inlet connector (e.g., 164 of FIG. 1B) of mobile trailer 110 may be fluidly connected to a first fuel cutoff valve 225 via an interior fuel hose 222. First fuel cutoff valve 225 may be fluidly connected to a fuel metering valve 230 that meters the delivery of fuel to the turbine system 360. In certain embodiments, fuel metering valve 230 may be, for example, an AGV10® gas fuel metering valve by Continental Controls Corporation®. One of ordinary skill in the art will recognize that other gas fuel metering valves may be used in accordance with one or more embodiments of the present invention. Fuel metering valve 230 may be fluidly connected to a second fuel cutoff valve 235. Second fuel cutoff valve 235 may be fluidly connected to the turbine system 360, providing metered fuel for the turbine system 360. Fuel metering valve 230 may be controlled by a fuel control system 240 that adjusts the throttling orifice to change fuel flow as necessary to ensure that the metered fuel flow equals fuel demand of the turbine system 360. A lubricating oil system 245 may provide lubricants used to lubricate the moving parts of the turbine system 360. In one or more embodiments of the present invention, the exemplary turbine system 360 may be powered by natural gas provided via an external source fluidly connected to the exterior fuel inlet connector (e.g., 164 of FIG. 1B). In certain embodiments, the turbine system 360 may be powered by flare gas generated on-site during fracking, drilling, or production operations.

During the combustion process of the turbine system 360, air is drawn into the turbine air intake 302 and is compressed by the multi-stage compressor 303. The compressed air is directed into the annular combustion chamber (not shown) of the combustor 304 at a steady flow rate. Fuel (not shown) is injected and mixed with compressed air and ignited. So long as there is a continuous flow of pressurized air and fuel, combustion will remain substantially continuous. Hot pressurized gas from the combustor 304 expands through and drives 306 the turbine wheels (not shown). The combustion process typically requires at least 25 percent of the total air it compresses. The excess air is mixed with combustion products and forms turbine exhaust that is collected in the turbine exhaust collector 300 and vented via the turbine exhaust port 350. Wastewater, fluidly communicated via an exterior wastewater inlet connector (e.g., 162 of FIG. 1B), may be regulated by an actuator 210, such as, for example, an HP series® pneumatic actuator by HKC Co., Ltd.® One of ordinary skill in the art will recognize that other actuators may be used in accordance with one or more embodiments of the present invention. Wastewater may be fluidly communicated from actuator 210 to an optional wastewater inlet connection 310 via an interior wastewater hose 215. The optional wastewater inlet connection 310 may be fluidly connected to a wastewater heating track inlet (e.g., 370 of FIG. 3A) of a wastewater heating track (e.g., 375, 380, 385 of FIG. 3A). The optional wastewater inlet connection 310 may be a connection mechanism that facilitates connecting interior wastewater hose 215 to the wastewater heating track inlet (e.g., 370 of FIG. 3A), but may not be required in certain applications or designs where the interior wastewater hose 215 connects directly to the wastewater heating track inlet (e.g., 370 of FIG. 3A). The wastewater heating track inlet (e.g., 370 of FIG. 3A) fluidly communicates wastewater through the wastewater heating track (e.g., 375, 380, 385 of FIG. 3A) disposed within the turbine exhaust collector 300. As wastewater is communicated through the wastewater heating track outlet (e.g., 365 of FIG. 3A), turbine exhaust in the turbine exhaust collector 300 heats the wastewater disposed within the wastewater heating track (e.g., 375, 380, 385 of FIG. 3A). Heated wastewater exits the wastewater heating track outlet (e.g., 365 of FIG. 3A) of the wastewater heating track (e.g., 375, 380, 385 of FIG. 3A) and may be fluidly communicated from an optional wastewater outlet connection 330 to a wastewater manifold 340. The optional wastewater outlet connection 330 may be a connection mechanism that facilitates connecting the wastewater heating track outlet (e.g., 365 of FIG. 3A) to the wastewater manifold 340, but may not be required in certain applications or designs where the wastewater heating track outlet (e.g., 365 of FIG. 3A) connects directly to the wastewater manifold 340. Wastewater manifold 340 may fluidly communicate heated wastewater, via a plurality of fixed or flexible conduits 400, to a plurality of wastewater atomization nozzles (e.g., 410 of FIG. 3A). The plurality of wastewater atomization nozzles (e.g., 410 of FIG. 3A) may be at least partially disposed within the turbine exhaust port 350, such that atomized wastewater (not shown) may be directed into the interior of the turbine exhaust port 350 and is converted to steam in the presence of hot turbine exhaust in the turbine exhaust port 350. The wastewater steam and turbine exhaust may be directed away from the system 100. For serviceability of the wastewater atomization nozzles 410 that may require service or replacement, wastewater manifold 140 may be used to convey wastewater from the exhaust collector 300 to the turbine exhaust port 350 for atomization and conversion into steam. The location of the wastewater atomization nozzles 410 may be readily accessible and easily serviced or replaced. However, one of ordinary skill in the art will recognize that wastewater manifold 140 may be optional in certain embodiments and the heating and atomization may take place entirely within the exhaust collector 300 or the exhaust collector 300 and turbine exhaust port 350 in accordance with one or more embodiments of the present invention.

Figure 2B:
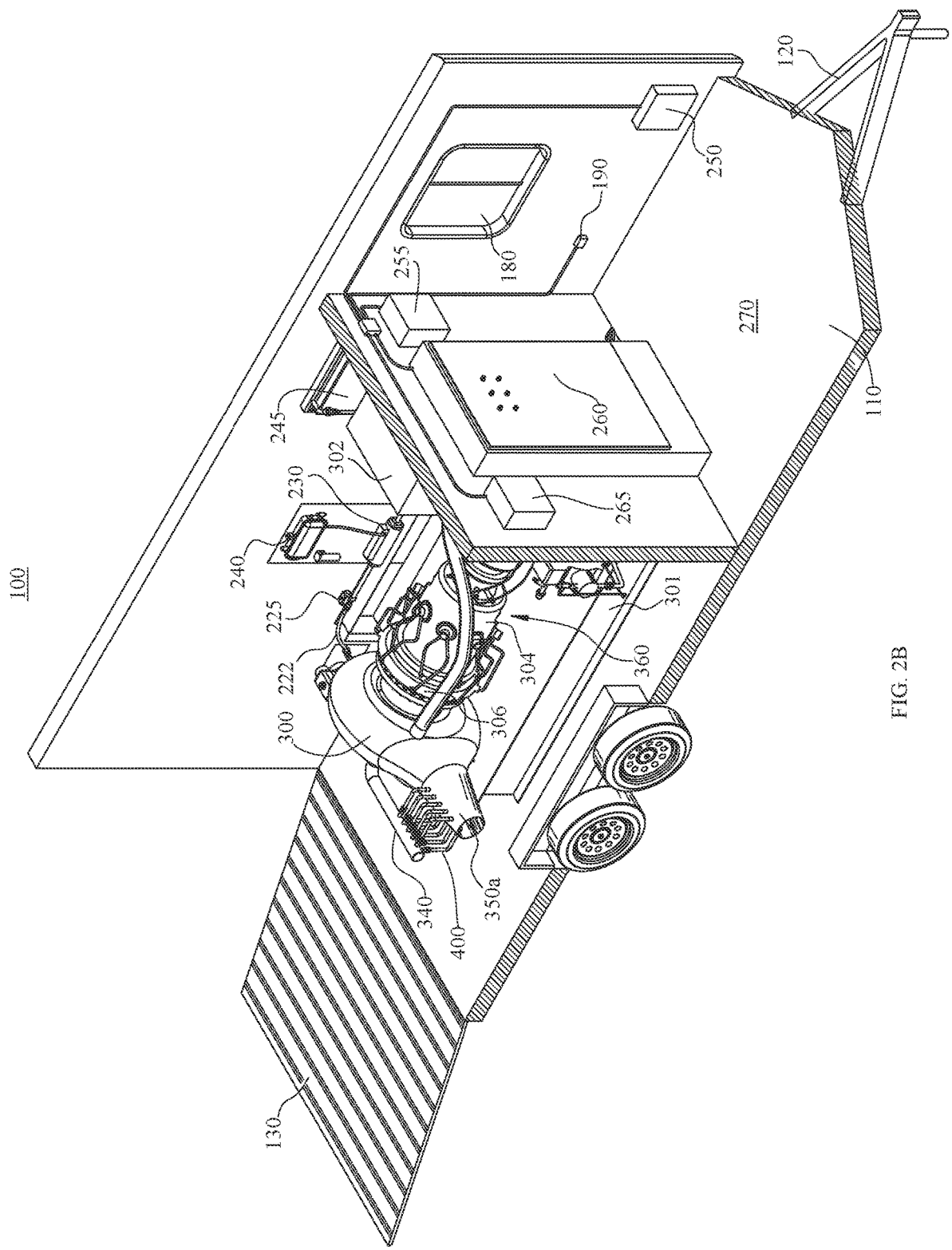
FIG. 2B shows a left-side front-facing interior perspective view of a mobile wastewater evaporation system in accordance with one or more embodiments of the present invention.
Figure 2C:
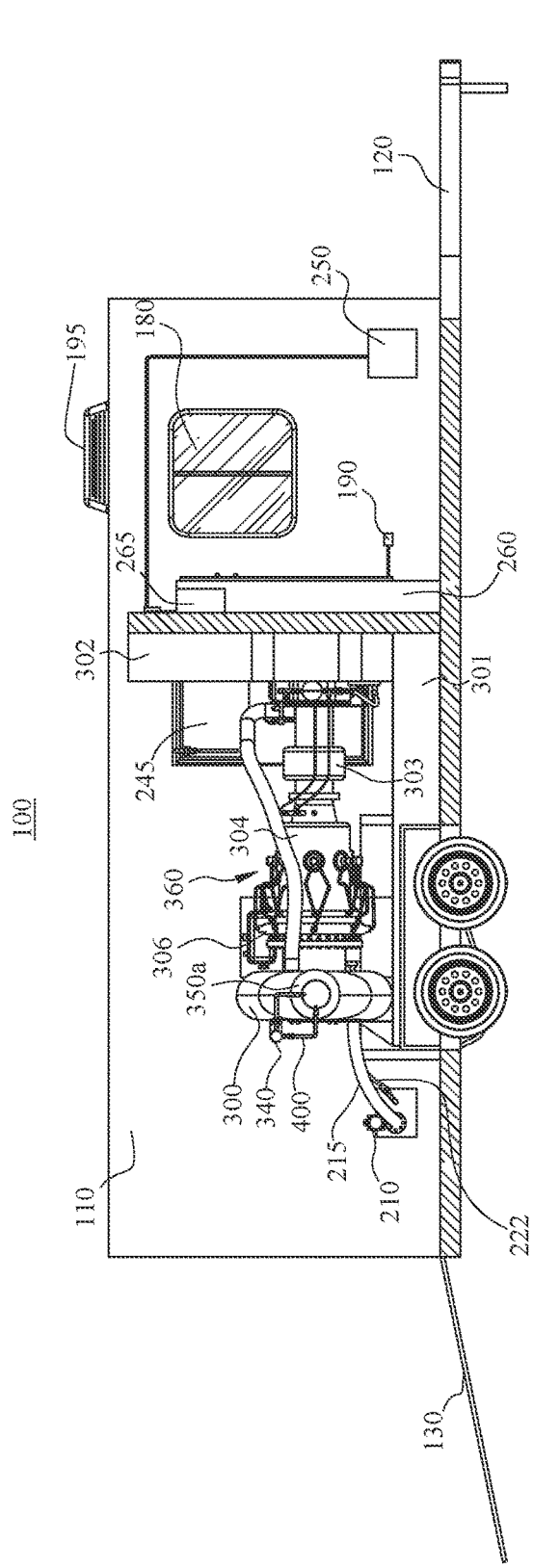
FIG. 2C shows a left-side interior elevation view of a mobile wastewater evaporation system in accordance with one or more embodiments of the present invention.
Figure 2D:
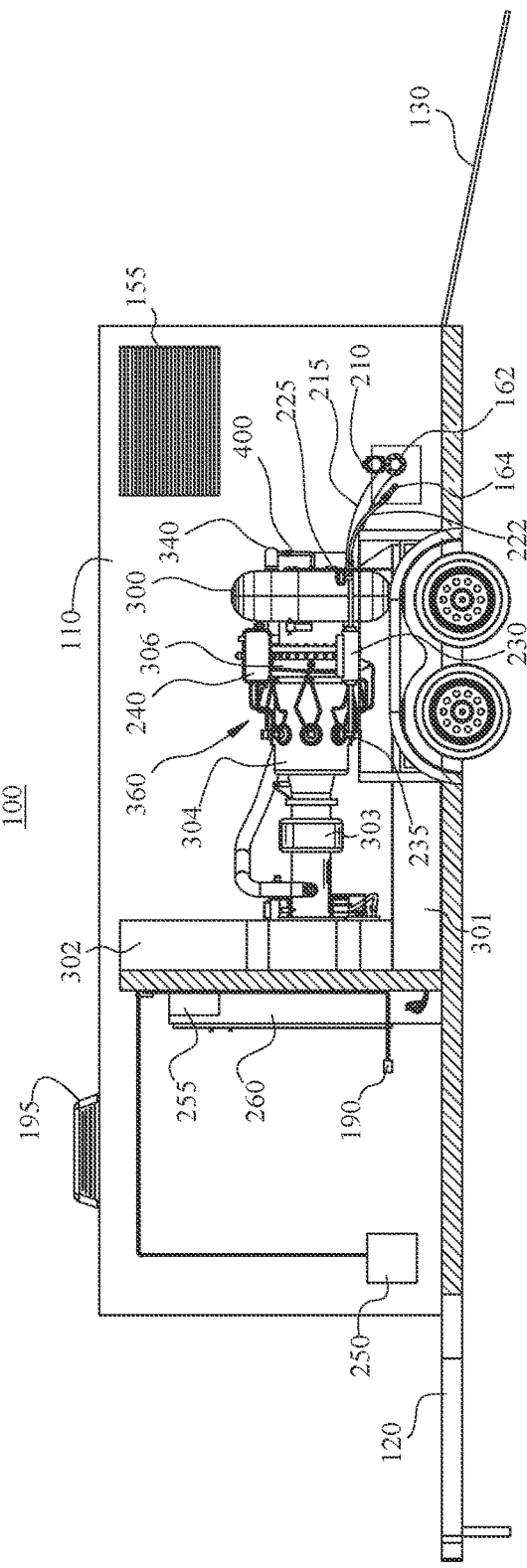
FIG. 2D shows a right-side interior elevation view of a mobile wastewater evaporation system in accordance with one or more embodiments of the present invention.
Figure 2E:
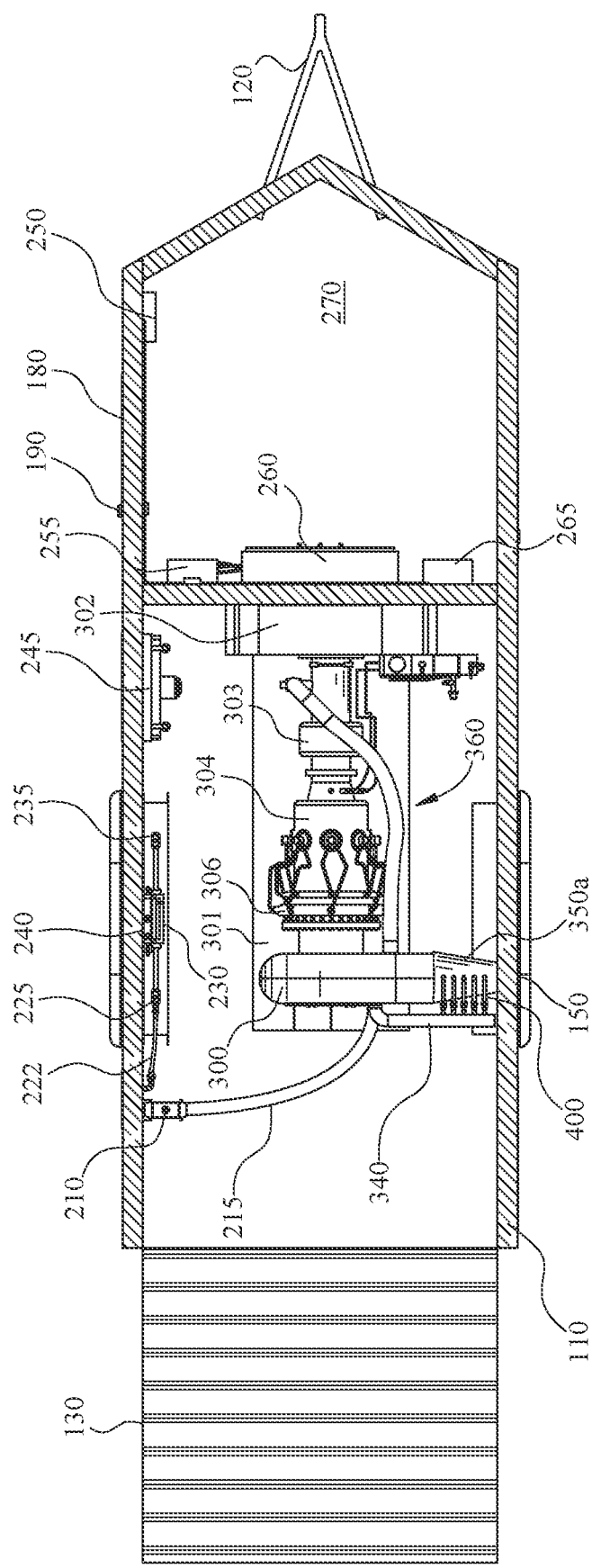
FIG. 2E shows a top interior plan view of a mobile wastewater evaporation system in accordance with one or more embodiments of the present invention.

Continuing, FIG. 2B shows a left-side front-facing interior perspective view of a mobile wastewater evaporation system 100 in accordance with one or more embodiments of the present invention. The optional control room 270 may house one or more electrically powered components that govern operation of the turbine system 360. An electrical service panel 250 may serve as the input of electrical power, via on-site electrical service drop (not shown), externally powered generator (not shown), or electrical power provided by an optional generator (not shown) of the turbine system 360. An optional battery backup system 255 may be included to ensure the continuity of operations when working with less-than-ideal electrical power quality and service. A computer or Programmable Logic Controller ("PLC") 260 may be used to control various 24 $V_{DC}$ systems of the turbine system 360. For example, PLC 260 may include one or more controls that are made available to an on-site operator, including, for example, a control system power button, a turbine start button, a turbine stop button, a turbine reset button, a turbine detergent wash button, a turbine speed control knob, or controls for the mechanical drive. In addition, the one or more controls may optionally be made available to a remote operator via a network connection such as, for example, a fixed network connection (not shown), a cellular network connection (not shown), or a satellite network connection (not shown). In such embodiments, once the mobile wastewater evaporation system 100 is disposed on the job site and fully connected to sources of fuel and wastewater, operation of the system 100 may be fully remotely controllable, via a remote operator with a software application, without any on site personnel. In certain embodiments, system 100 may further include a PLC 265 that may be used to control the operation of various AC powered systems including, for example, the AC powered water pumps (not shown) and an exhaust fan (e.g., 155 of FIG. 1A). Continuing, FIG. 2C shows a left-side interior elevation view of a mobile wastewater evaporation system 100 in accordance with one or more embodiments of the present invention. Continuing, FIG. 2D shows a right-side interior elevation view of a mobile wastewater evaporation system 100 in accordance with one or more embodiments of the present invention. Continuing, FIG. 2E shows a top interior plan view of a mobile wastewater evaporation system 100 in accordance with one or more embodiments of the present invention.

Figure 3A:
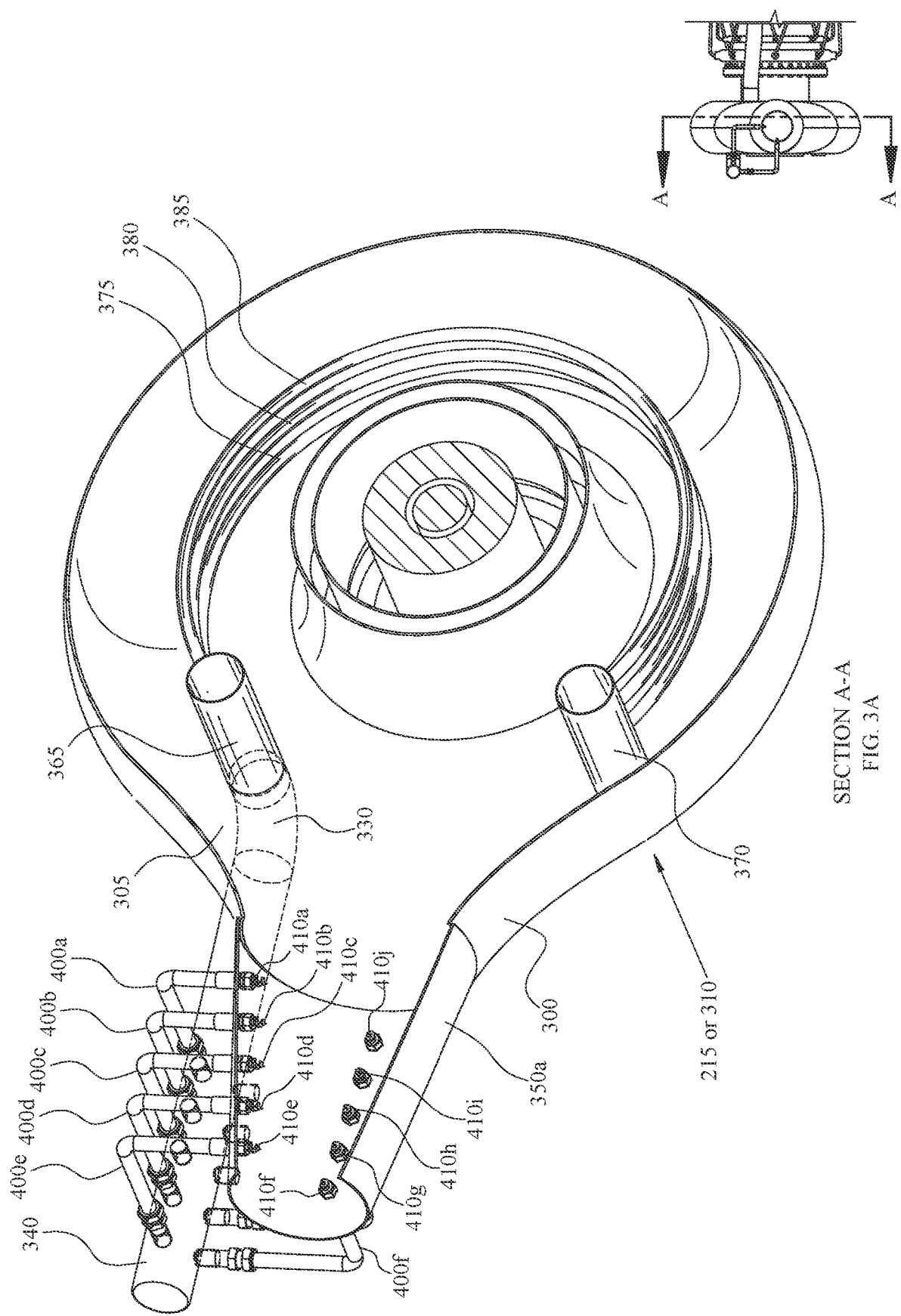
FIG. 3A shows a cross-sectional perspective view of a portion of a turbine exhaust collector and a wastewater heating track disposed within the interior of the turbine exhaust collector in accordance with one or more embodiments of the present invention.

FIG. 3A shows a cross-sectional perspective view of a portion of a turbine exhaust collector 300 and a wastewater heating track (e.g., 375, 380, 385) disposed within the interior 305 of the turbine exhaust collector 300 in accordance with one or more embodiments of the present invention. As noted above, the interior wastewater hose (e.g., 215) may be fluidly connected to the optional wastewater inlet connection (e.g., 310) to the wastewater heating track inlet 370. The wastewater heating track inlet 370 may fluidly communicate wastewater to the wastewater heating track outlet 365 via one or more wastewater pipe segments (e.g., 375, 380, 385) of the wastewater heating track that are disposed within the interior 305 of the turbine exhaust collector 300 in the flow path of turbine exhaust. In certain embodiments, the one or more wastewater pipe segments (e.g., 375, 380, 385) of the wastewater heating track may be composed of stainless steel. In other embodiments, the one or more wastewater pipe segments (e.g., 375, 380, 385) may be composed of copper, aluminum, or brass. In still other embodiments, the one or more pipe segments (e.g., 375, 380, 385) may be composed of a metal, alloy, or synthetic material having a high degree of thermal conductivity. One of ordinary skill in the art will recognize that any metal, alloy, synthetic material, or combination thereof having a high degree of thermal conductivity may be used in accordance with one or more embodiments of the present invention.

During operation of the turbine system 360, the wastewater heating track (e.g., 375, 380, 385) may be surrounded by hot turbine exhaust within the interior 305 of the turbine exhaust collector 300 that heats the wastewater being conveyed therein. Depending on the type or kind of turbine, the temperature of the turbine exhaust within the turbine exhaust collector 300 may be in a range between 500° F. and 1,000° F., with increased steam conversion efficiency at higher temperature. With the objective of maximally heating the wastewater conveyed by the wastewater heating track, the one or more wastewater pipe segments (e.g., 375, 380, 385) may have a size, shape, and number of pipe segments that convey wastewater in the flow path of hot turbine exhaust and maximally heat the wastewater conveyed therein. One of ordinary skill in the art will recognize that one or more pipe segments (e.g., 375, 380, 385) having a smaller diameter may more uniformly heat the wastewater conveyed therein than a larger diameter pipe segment, thereby increasing the efficiency of conversion to steam. One of ordinary skill in the art will also recognize that the size, shape, and number of pipe segments (e.g., 375, 380, 385), as well as their location within the turbine exhaust collector 300, may vary based on an application or design in accordance with one or more embodiments of the present invention. Heated wastewater may be conveyed through the wastewater heating track (e.g., 375, 380, 385) to the wastewater heating track outlet 365. The wastewater heating track outlet 365 may be fluidly connected to a wastewater manifold 340 directly or via an optional wastewater outlet connection 330 that may be integrated with the wastewater manifold 340. Heated wastewater may be conveyed from the wastewater manifold 340 to the interior of the turbine exhaust port 350a via a plurality of fixed or flexible conduits 400.

The plurality of conduits 400a-400j may be fluidly connected to a plurality of wastewater atomization nozzles 410a-410j that are at least partially disposed within the interior of the turbine exhaust port 350a. The wastewater atomization nozzles 410a-410j may be oriented such that their atomization tips (e.g., 425 of FIG. 4A) are directed towards the interior of the turbine exhaust port 350a. The location and pattern of arrangement of the plurality of wastewater atomization nozzles 410a-410j may be distributed about the turbine exhaust port 350a to maximize efficiency. In certain embodiments, the pattern of arrangement of the plurality of wastewater atomization nozzles 410a-410j may be arranged in a fixed pattern as shown in FIG. 3A. In other embodiments, the pattern of arrangement of the plurality of wastewater atomization nozzles 410a-410j may be arranged in a Fibonacci spiral (not shown) about the turbine exhaust port 350a. One of ordinary skill in the art will recognize that the location and pattern of arrangement of the plurality of wastewater atomization nozzles 410a-410j may vary based on an application or design in accordance with one or more embodiments of the present invention. One of ordinary skill in the art will also recognize that the size, shape, and number of atomization nozzles 410 may vary based on application or design.

Figure 3B:
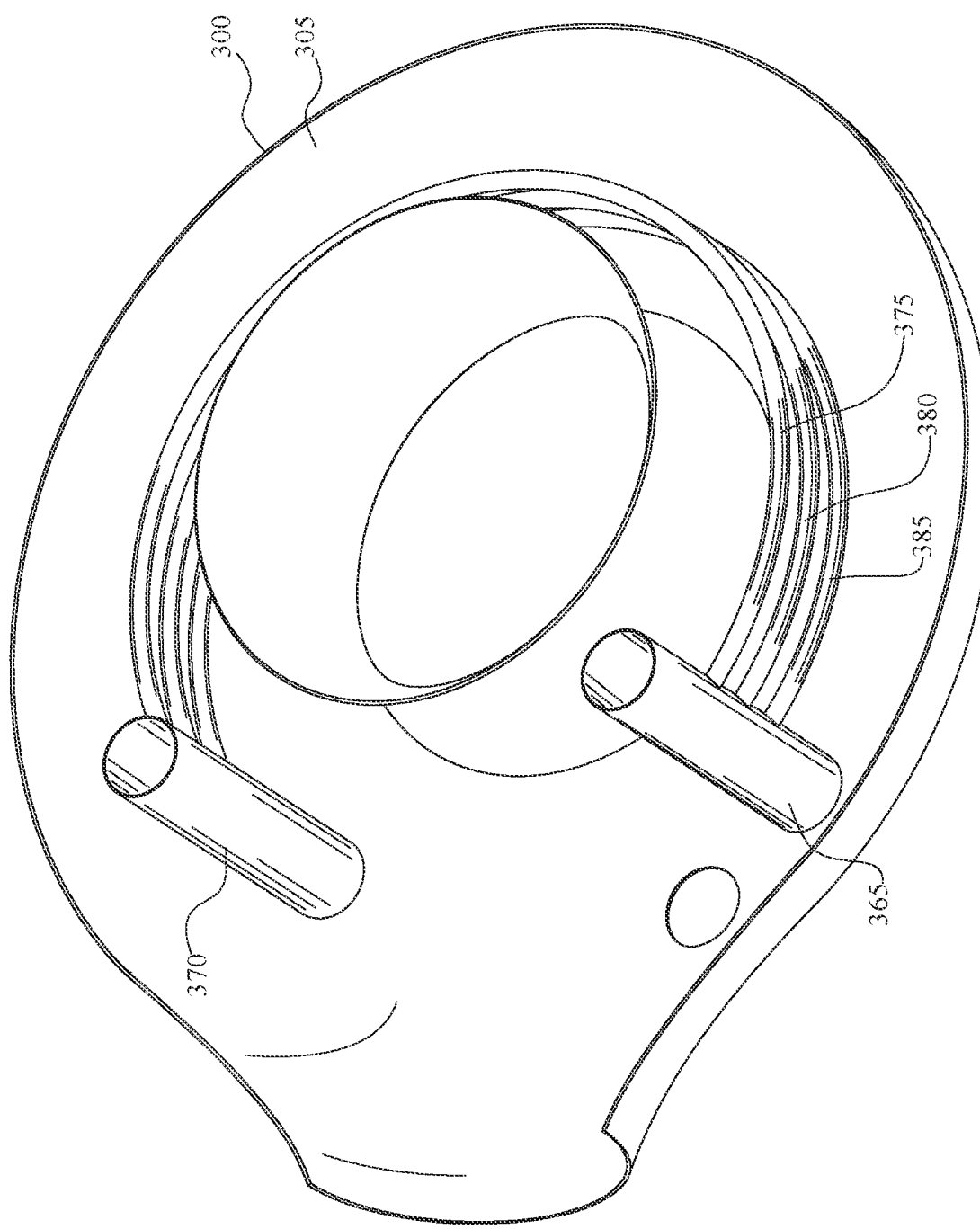
FIG. 3B shows a cross-sectional perspective view of a portion of a turbine exhaust collector and a wastewater heating track disposed within the interior of the turbine exhaust collector in accordance with one or more embodiments of the present invention.

The heated wastewater may be atomized by the plurality of wastewater atomization nozzles 410a-410j and converted to steam, if not already steam, in the presence of hot turbine exhaust within the turbine exhaust port 350a. The wastewater steam may be directed away from the turbine system (e.g., 360) with the turbine exhaust (not shown). Continuing, FIG. 3B shows a cross-sectional perspective view of a portion of a turbine exhaust collector 300 and a wastewater heating track (e.g., 375, 380, 385) disposed within the interior of the turbine exhaust collector in accordance with one or more embodiments of the present invention. In certain embodiments, a wastewater evaporation turbine system (e.g., 360) may be made by modifying an existing turbine system, such as, for example, the Solar® Saturn® gas-fueled turbine. In such modifications, the turbine exhaust collector 300 may be cross-sectioned such that the wastewater heating track (e.g., at least 375, 380, 385) may be disposed within the interior 305 of the turbine exhaust collector 360. Once properly disposed and ported, the cross-sectional portions may be welded back together returning the turbine exhaust collector 300 to its former shape. While modification of existing turbine systems (e.g., 360) is possible, custom made wastewater evaporation turbine systems may be made for the purpose of wastewater evaporation in accordance with one or more embodiments of the present invention. Thermal blankets or insulation (not shown) may be disposed outside and around the turbine exhaust collector 300 to insulate and retain heat within the turbine exhaust collector 300 that is used to heat the wastewater disposed therein that is ultimately converted to steam.

Figure 4B:
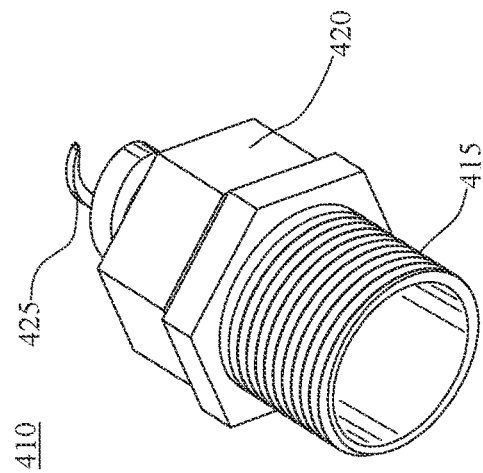
FIG. 4B shows a bottom-facing perspective view of a wastewater atomization nozzle in accordance with one or more embodiments of the present invention.
Figure 4D:
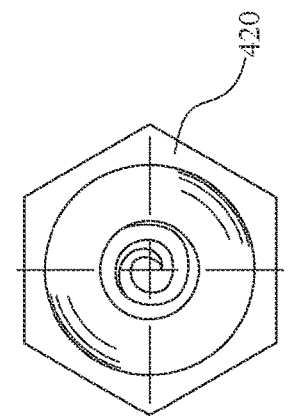
FIG. 4D shows a bottom plan view of a wastewater atomization nozzle in accordance with one or more embodiments of the present invention.
Figure 4A:
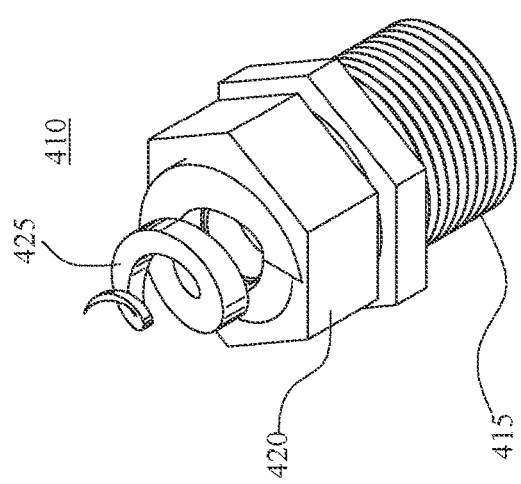
FIG. 4A shows a top-facing perspective view of a wastewater atomization nozzle in accordance with one or more embodiments of the present invention.
Figure 4C:
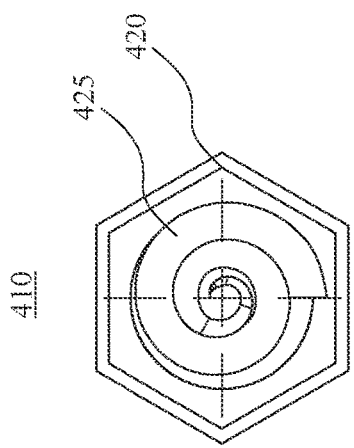
FIG. 4C shows a top plan view of a wastewater atomization nozzle in accordance with one or more embodiments of the present invention.
Figure 4E:
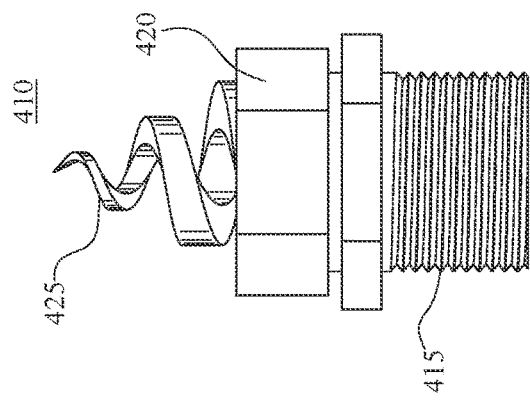
FIG. 4E shows a front elevation view of a wastewater atomization nozzle in accordance with one or more embodiments of the present invention.
Figure 4F:
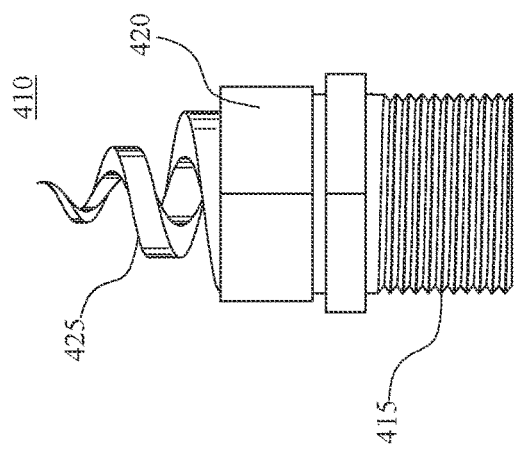
FIG. 4F shows a rear elevation view of a wastewater atomization nozzle in accordance with one or more embodiments of the present invention.
Figure 4G:
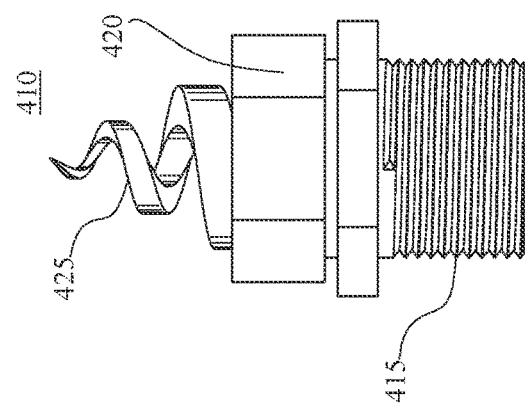
FIG. 4G shows a right-side elevation view of a wastewater atomization nozzle in accordance with one or more embodiments of the present invention.
Figure 4H:
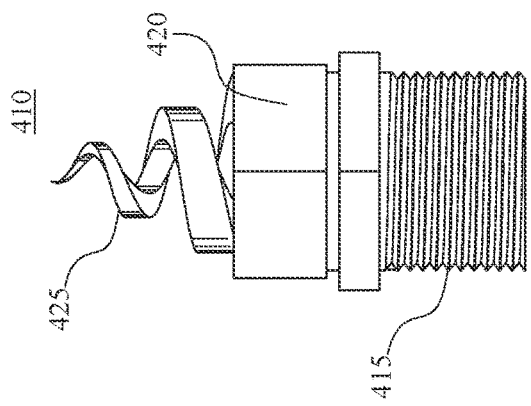
FIG. 4H shows a left-side elevation view of a wastewater atomization nozzle in accordance with one or more embodiments of the present invention.

FIG. 4A shows a top-facing perspective view of a wastewater atomization nozzle 400 in accordance with one or more embodiments of the present invention. Wastewater atomization nozzle 400 may include a threaded end 415, a mounting bolt 420, and an atomization tip 425 that atomizes heated wastewater. In certain embodiments, the atomization tip 425 of wastewater atomization nozzle 400 may include three turns per square inch. One of ordinary skill in the art will recognize that the number of turns may vary based on an application or design in accordance with one or more embodiments of the present invention. Moreover, the atomization tip 425 may have a size and shape that efficiently atomizes heated wastewater. Continuing, FIG. 4B shows a bottom-facing perspective view of a wastewater atomization nozzle 400 in accordance with one or more embodiments of the present invention. The threaded end 415 of the wastewater atomization nozzle 400 may include an orifice that fluidly communicates heated wastewater to the atomization tip 425. Continuing, FIG. 4C shows a top plan view of a wastewater atomization nozzle 400 in accordance with one or more embodiments of the present invention. Continuing, FIG. 4D shows a bottom plan view of a wastewater atomization nozzle 400 in accordance with one or more embodiments of the present invention. Continuing, FIG. 4E shows a front elevation view of a wastewater atomization nozzle 400 in accordance with one or more embodiments of the present invention. Continuing, FIG. 4F shows a rear elevation view of a wastewater atomization nozzle 400 in accordance with one or more embodiments of the present invention. Continuing, FIG. 4G shows a right-side elevation view of a wastewater atomization nozzle 400 in accordance with one or more embodiments of the present invention. Continuing, FIG. 4H shows a left-side elevation view of a wastewater atomization nozzle 400 in accordance with one or more embodiments of the present invention. In certain embodiments, wastewater atomization nozzle 400 may be composed of stainless steel. In other embodiments, wastewater atomization nozzle 400 may be composed of copper, aluminum, or brass. In still other embodiments, wastewater atomization nozzle 400 may be composed of an alloy having a high degree of thermal conductivity. One of ordinary skill in the art will recognize that any metal, alloy, or synthetic material having a high degree of thermal conductivity may be used in accordance with one or more embodiments of the present invention. One of ordinary skill in the art will recognize that the size, shape, and number of wastewater atomization nozzles 400 may vary based on an application or design in accordance with one or more embodiments of the present invention.

Figure 5A:
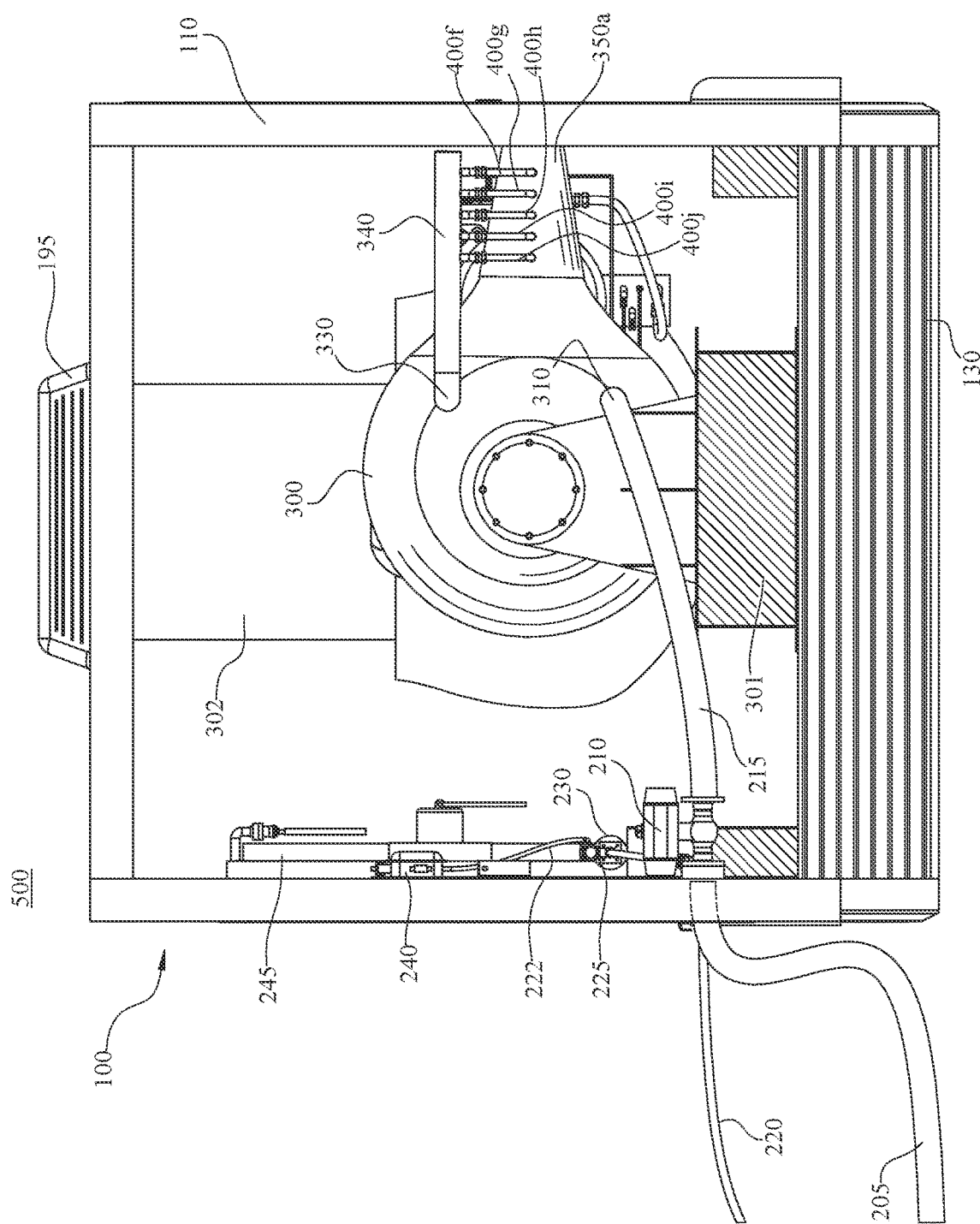
FIG. 5A shows a rear elevation view of a mobile wastewater evaporation system in operative use in accordance with one or more embodiments of the present invention.
Figure 5B:
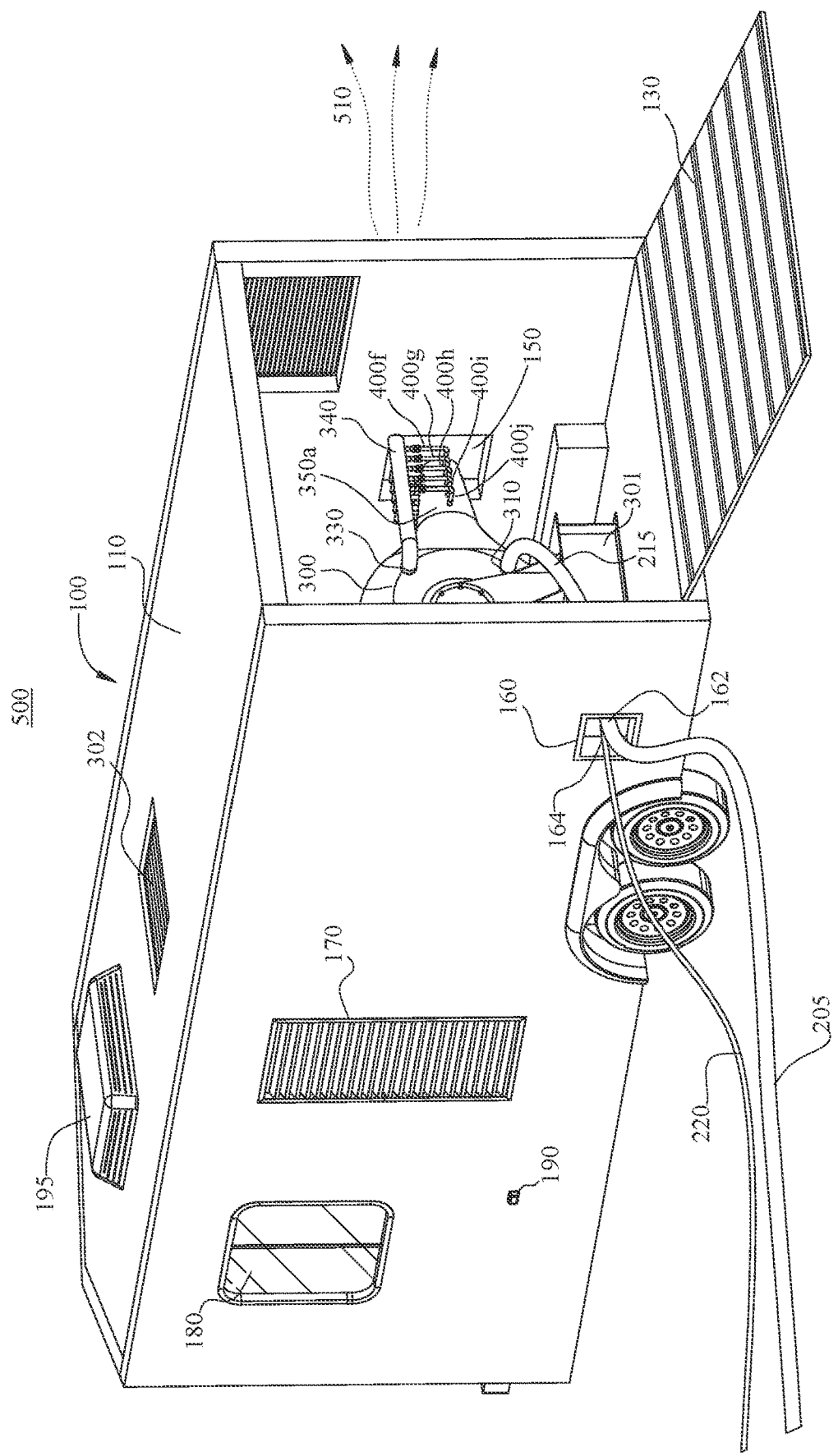
FIG. 5B shows a right-side rear-facing perspective view of a mobile wastewater evaporation system in operative use in accordance with one or more embodiments of the present invention.
Figure 5C:
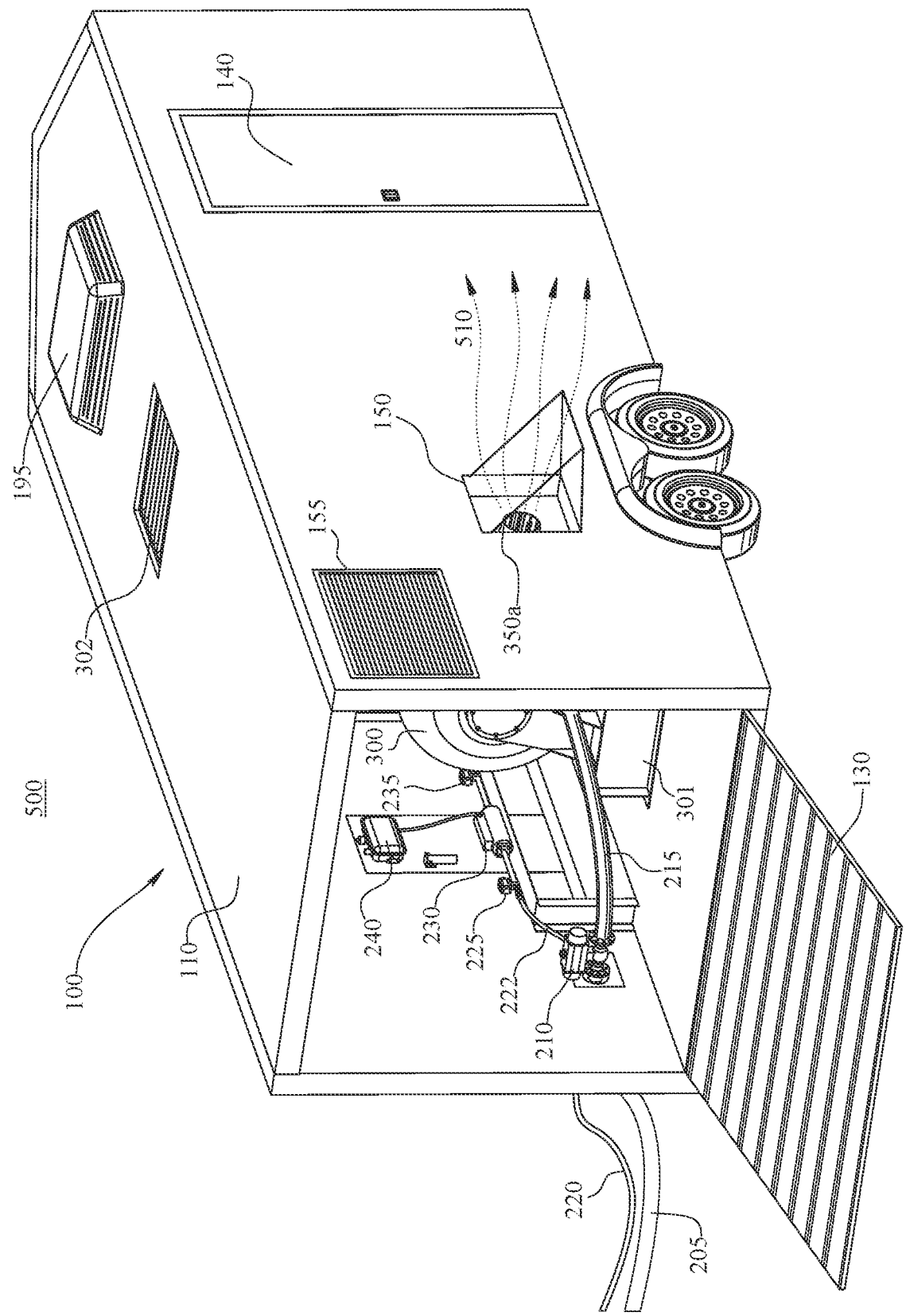
FIG. 5C shows a left-side rear-facing perspective view of a mobile wastewater evaporation system in operative use in accordance with one or more embodiments of the present invention.

FIG. 5A shows a rear elevation view of a mobile wastewater evaporation system 100 in operative use 500 in accordance with one or more embodiments of the present invention. An exterior wastewater hose 205 may fluidly connect to the exterior wastewater inlet connector (e.g., 162) to provide the source of wastewater to be evaporated by the wastewater evaporation turbine system 360. An exterior fuel hose 220 may fluidly connect to the exterior fuel inlet connector (e.g., 164) to provide fuel for the turbine system 360. Continuing, FIG. 5B shows a right-side perspective view of a mobile wastewater evaporation system 100 in operative use 500 in accordance with one or more embodiments of the present invention. The turbine exhaust port 350a may be disposed, with additional ducting and venting as necessary, such that turbine exhaust flows out of the exhaust window (e.g., 150) of the mobile trailer 110. Continuing, FIG. 5C shows a right-side perspective view of a mobile wastewater evaporation system 100 in operative use 500 in accordance with one or more embodiments of the present invention. Heated wastewater may be converted to steam and directed away from the turbine system (e.g., 360) with the turbine exhaust through the turbine exhaust port 350a. The steam and turbine exhaust, collectively shown as reference numeral 510, may be directed out of the exhaust window 150 of the mobile trailer 110 and away from the system 100.

While the wastewater evaporation system disclosed herein has been described as being optionally mobile and optionally remotely controllable, one of ordinary skill in the art, having the benefit of this disclosure, will readily appreciate that the wastewater evaporation system may not be mobile and/or may not be remotely controllable, in accordance with one or more embodiments of the present invention.

As the flow rate of wastewater through the wastewater evaporation system increases, some wastewater may not reach a high enough temperature to convert to steam and the conversion efficiency of the system may decrease. While the maximum flow rate for efficient conversion may vary based on the size and configuration of components that constitute the wastewater evaporation system, the maximum flow rate for efficient conversion for a given configuration is the flow rate at which substantially all wastewater is converted to steam. As the flow rate exceeds this maximum, wastewater may move through the system so quickly that some of the wastewater may not reach a high enough temperature prior to atomization to convert to steam within the exhaust port. In one or more embodiments of the present invention, a method and system for wastewater evaporation may be modified to increase the temperature of wastewater prior to atomization and direct atomized wastewater towards an interior surface of the exhaust port to enhance the conversion efficiency and achieve a higher maximum flow rate for efficient conversion.

In certain embodiments, a modified exhaust port 350*b* may be used instead of exhaust port 350*a* of FIG. 3A as part of a wastewater evaporation system. FIG. 6A shows a perspective view of exhaust port 350*b* with a plurality of exhaust port piping 610 disposed about an exterior surface of the exhaust port 350*b* in accordance with one or more embodiments of the present invention. A plurality of exhaust port piping 610*a*-610*j* may be disposed about the exterior surface of a cone portion 620 of exhaust port 350*b*. While only some of the plurality of exhaust port piping 610*a*-610*g* are shown in this view, one of ordinary skill in the art, having the benefit of this disclosure, will appreciate that there is a one-to-one correspondence between the plurality of exhaust port piping 610a-610j and the plurality of wastewater atomization nozzles 410a-410j. Additionally, one of ordinary skill in the art will also recognize that the number of wastewater atomization nozzles 410 may vary based on an application or design in accordance with one or more embodiments of the present invention. The plurality of exhaust port piping 610a-610j and cone portion 620 may be composed of stainless steel, copper, aluminum, brass, or any other metal, alloy, or synthetic material having a high degree of thermal conductivity. The plurality of exhaust port piping 610a-610j may have a size, shape, and length that enhances the thermal transfer of heat to the wastewater fluidly communicated therethrough. While a trombone-like shape of exhaust port piping 610a-610j is shown, the thermal transfer of heat may be influenced by the size, shape, and length of exhaust port piping 610 and the surface area that makes thermal contact with cone portion 620 of exhaust port 350b. One of ordinary skill in the art will recognize that the size, shape, and length of the plurality of exhaust port piping 610 may vary based on an application or design in accordance with one or more embodiments of the present invention.

In certain embodiments, wastewater manifold 340 may fluidly connect the track outlet (e.g., 365 of FIG. 3A) of the wastewater heating track (e.g., 375, 380, and 385 of FIG. 3A) to the plurality of wastewater atomization nozzles 410a-410j via the corresponding plurality of exhaust port piping 610a-610j. A plurality of conduits 630a-630j may removably and fluidly connect wastewater manifold 340 to the plurality of exhaust port piping 610a-610j (not all shown in this view). The plurality of wastewater atomization nozzles 410a-410j (not all shown in this view) may be removably attached to a distal end of the plurality of exhaust port piping 610a-610j (not all shown in this view) and may be at least partially disposed within exhaust port 350b such that the tips of the nozzles 410 direct atomized wastewater into the interior of exhaust port 350b. To facilitate transportability as part of a mobile wastewater evaporation system (e.g., 700 of FIG. 7A-7D), exhaust port 350b may be removably attached to exhaust collector 300. For example, exhaust port 350b may include a flange 640 that allows exhaust port 350b to be attached to exhaust collector 300 upon assembly and detached upon disassembly. The plurality of conduits 630a-630j facilitate removable fluid connectivity between wastewater manifold 340 and the plurality of exhaust port piping 610a-610j (not all shown in this view) upon attaching exhaust port 350b to, or detaching exhaust port 350b from, exhaust collector 300 on site.

Continuing, FIG. 6B shows a cross-sectional perspective view of a portion of an exhaust port 350b with a plurality of exhaust port piping 610a-610j (not all shown in this view) disposed about an exterior surface of the exhaust port 350b and a turbine exhaust collector 300 in accordance with one or more embodiments of the present invention. The plurality of exhaust port piping 610a-610j may be in thermal contact with, or otherwise thermally coupled to, the exterior surface of cone portion 620 of exhaust port 350b. Turbine exhaust from exhaust collector 300 may be discharged through exhaust port 350b. The temperature of the turbine exhaust within the exhaust port 350b may increase the temperature of the exterior surface of cone portion 620 of exhaust port 350b. The thermal coupling between the exterior surface of cone portion 620 and the plurality of exhaust port piping 610a-610j may increase the temperature of wastewater as it is being fluidly communicated through the plurality of exhaust port piping 610a-610j towards the plurality of wastewater atomization nozzles 410a-410j (not all shown in this view). The increased temperature of the wastewater may enhance atomization and increase the efficiency by which atomized wastewater is converted to steam within the exhaust port 350b.

Continuing, FIG. 6C shows a cross-sectional view through an interior portion of an exhaust port 350b with a plurality of exhaust port piping 610a-610j disposed above an exterior surface of the exhaust port 350b in accordance with one or more embodiments of the present invention. The placement of the plurality of wastewater atomization nozzles 410a-410j may be in a pattern that promotes conversion of atomized wastewater to steam within the exhaust port 350b. In the example depicted, a Fibonacci spiral-like pattern may be used to dispose wastewater atomization nozzles 410a-410j along the length of cone portion 620 of exhaust port 350b such that they direct atomized wastewater towards an interior surface of cone portion 620 rather than other atomization nozzles 410a-410j. Atomized wastewater may be converted to steam in the presence of turbine exhaust within exhaust port 350b. To the extent atomized wastewater is not converted to steam before making contact with cone portion 620, contact with cone portion 620 further increases the temperature of the atomized wastewater and further promotes increased conversion efficiency. One of ordinary skill in the art will recognize that any pattern that prevents atomization nozzles 410a-410j from directing atomized wastewater into the path of other atomization nozzles or atomized wastewater may be used in accordance with one or more embodiments of the present invention.

Figure 7B:
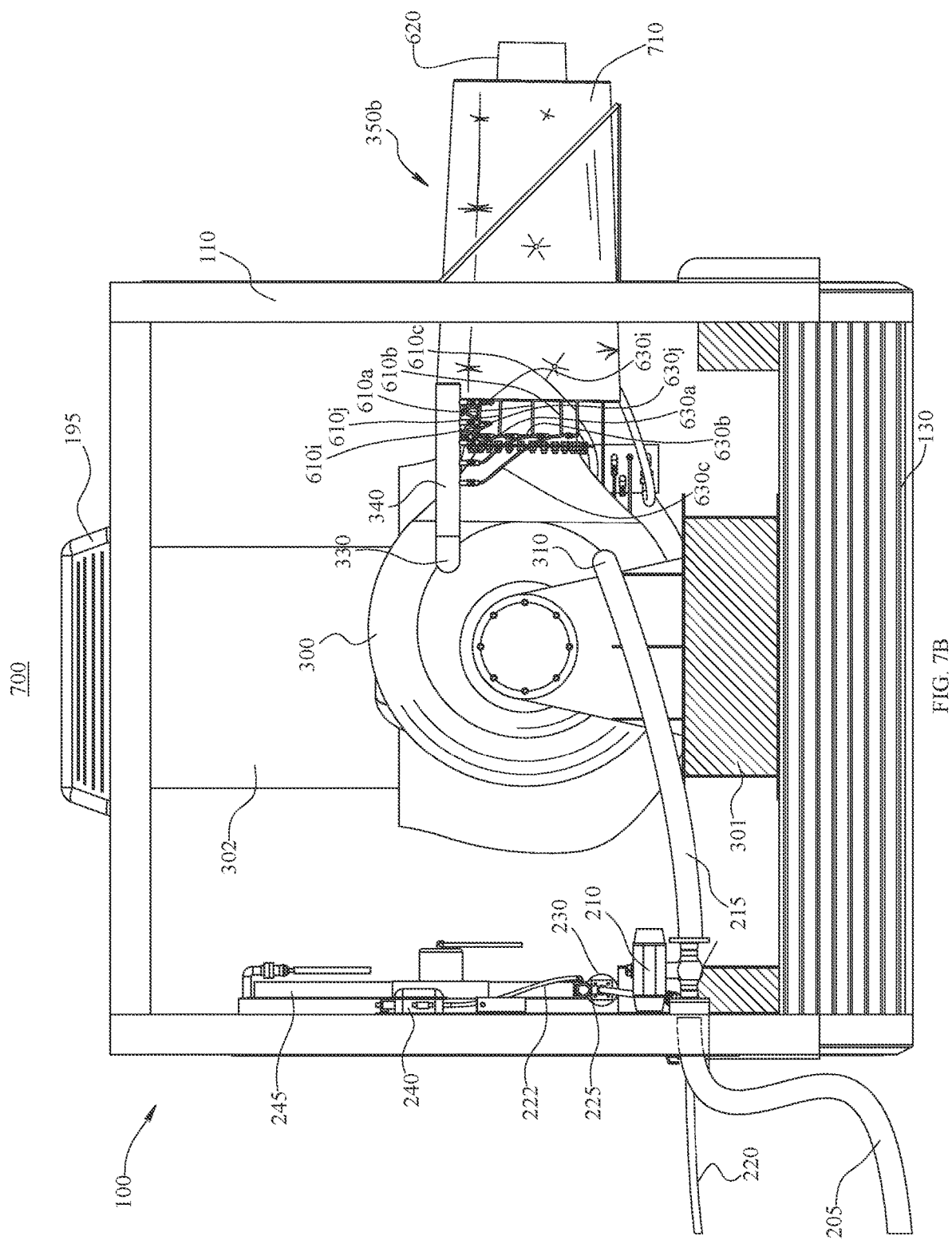
FIG. 7B shows a rear elevation view of a mobile wastewater evaporation system with an exhaust port with a plurality of exhaust port piping disposed about an exterior surface of the exhaust port in accordance with one or more embodiments of the present invention.

FIG. 7A shows a top interior plan view of a mobile wastewater evaporation system 700 with an exhaust port 350b having a plurality of exhaust port piping 610 disposed about 1162-0002-US CIP an exterior surface of the exhaust port 350b in accordance with one or more embodiments of the present invention. As noted above, the length of exhaust port 350b may require that the exhaust port 350b be transported in a detached state and attached to the turbine exhaust collector 300 on the job site. Once assembled, part of cone portion 620 of exhaust port 350b may extend beyond the wall of mobile trailer 110. In certain embodiments, a thermal blanket 710 may be wrapped around exhaust port 350b to retain as much heat as possible and further promote conversion efficiency. Continuing, FIG. 7B shows a rear elevation view of a mobile wastewater evaporation 700 system with an exhaust port 350b having a plurality of exhaust port piping 610a-610j (covered by thermal blanket 710 in this view) disposed about an exterior surface of the exhaust port 350b in accordance with one or more embodiments of the present invention.

Figure 7C:
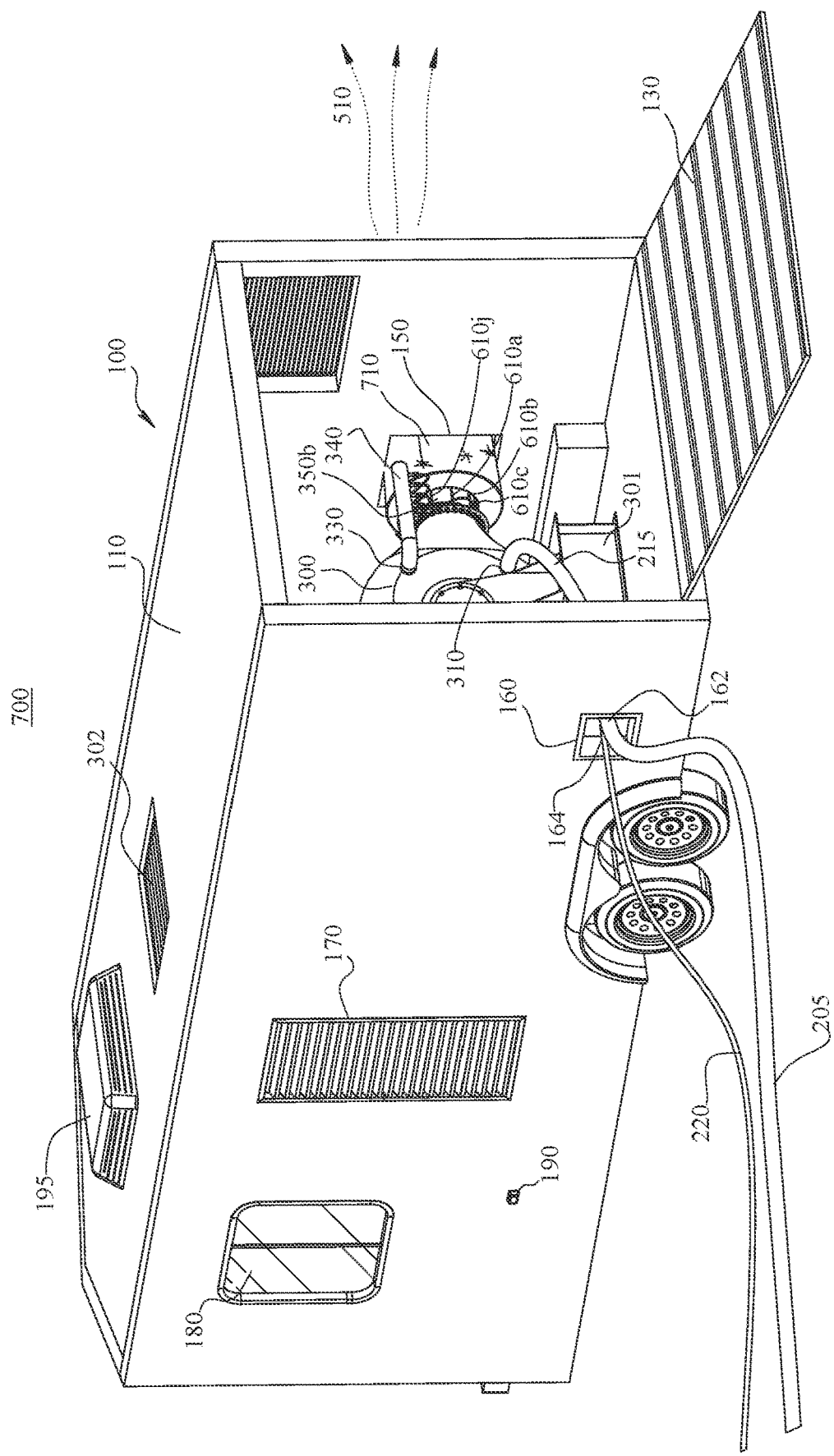
FIG. 7C shows a right-side rear-facing perspective view of a mobile wastewater evaporation system with an exhaust port with a plurality of exhaust port piping disposed about an exterior surface of the exhaust port in operative use in accordance with one or more embodiments of the present invention.
Figure 7D:
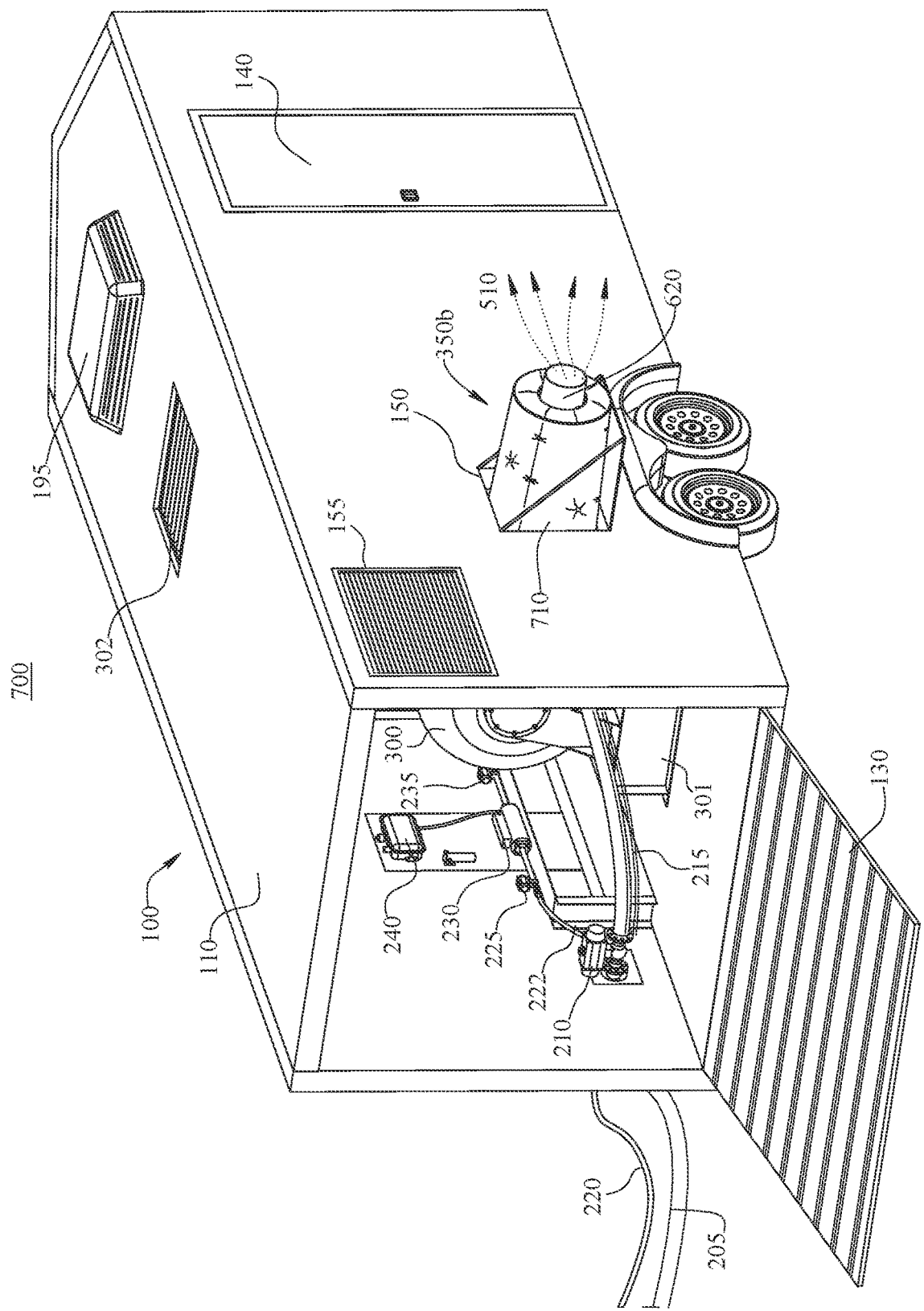
FIG. 7D shows a left-side rear-facing perspective view of a mobile wastewater evaporation system with an exhaust port with a plurality of exhaust port piping disposed about an exterior surface of the exhaust port in operative use in accordance with one or more embodiments of the present invention.

Continuing, FIG. 7C shows a right-side rear-facing perspective view of a mobile wastewater evaporation system 700 with an exhaust port 350b having a plurality of exhaust port piping 610a-610j (some not shown in this view) disposed about an exterior surface of the exhaust port 350b in operative use in accordance with one or more embodiments of the present invention. Continuing, FIG. 7D shows a left-side rear-facing perspective view of a mobile wastewater evaporation system 700 with an exhaust port 350b having a plurality of exhaust port piping 610a-610j (some not shown in this view) disposed about an exterior surface of the exhaust port 350b in operative use in accordance with one or more embodiments of the present invention.

Figure 6A:
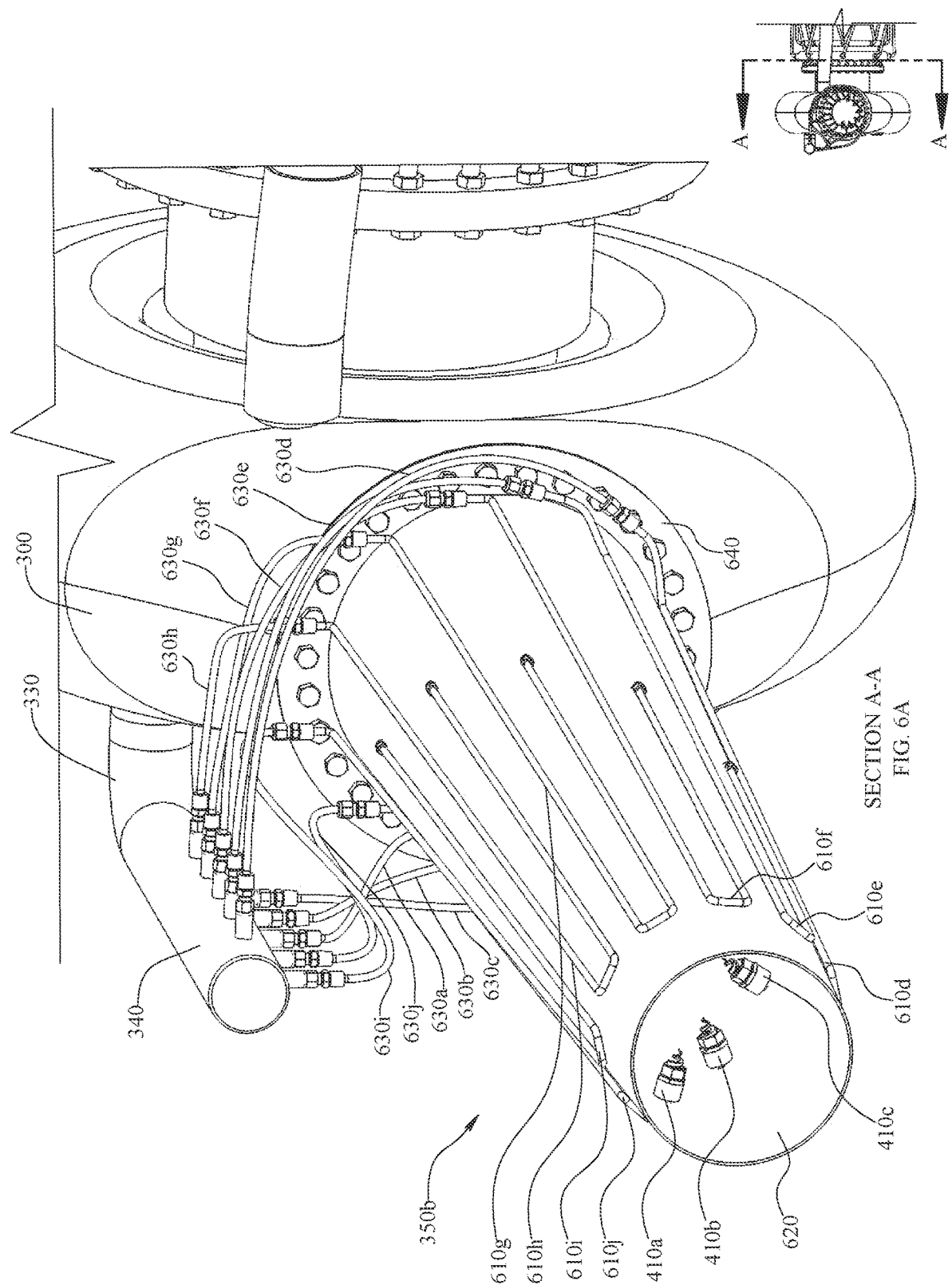
FIG. 6A shows a perspective view of an exhaust port with a plurality of exhaust port piping disposed about an exterior surface of the exhaust port in accordance with one or more embodiments of the present invention.
Figure 8A:
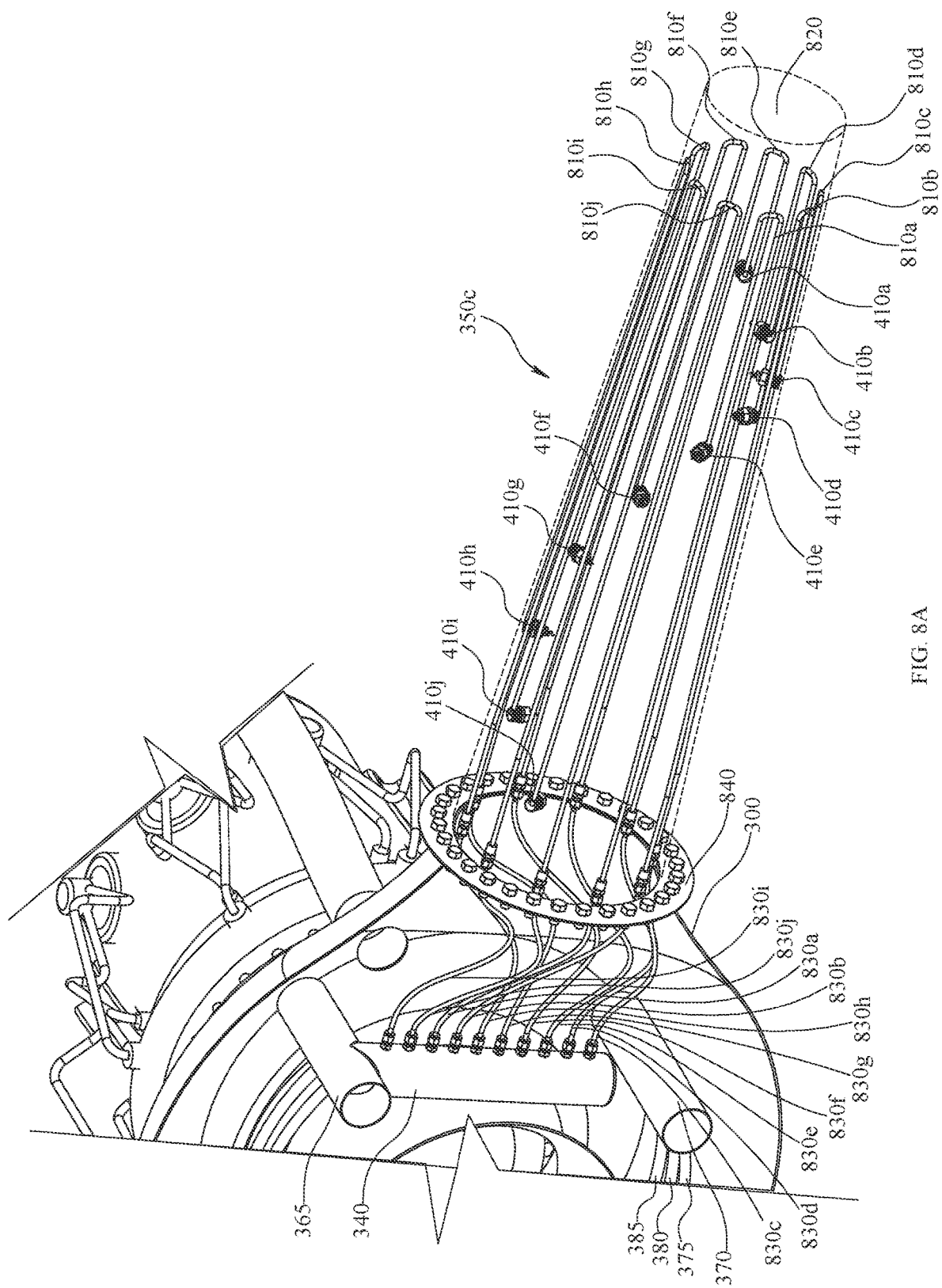
FIG. 8A shows a perspective view of an exhaust port with a plurality of exhaust port piping disposed about an interior surface of the exhaust port in accordance with one or more embodiments of the present invention.

In certain embodiments, a modified exhaust port 350c may be used instead of exhaust port 350a of FIG. 3A or exhaust port 350b of FIG. 6A as part of a wastewater evaporation system. FIG. 8A shows a perspective view of an exhaust port 350c with a plurality of exhaust port piping 810a-810j disposed about an interior surface of exhaust port 350c in accordance with one or more embodiments of the present invention. A plurality of exhaust port piping 810a-810j may be disposed about the interior surface of a cone portion 820 of exhaust port 350c. The plurality of exhaust port piping 810a-810j and cone portion 820 may be composed of stainless steel, copper, aluminum, brass, or any other metal, alloy, or synthetic material having a high degree of thermal conductivity. The plurality of exhaust port piping 810a-810j may have a size, shape, and length that enhances the thermal transfer of heat to the wastewater fluidly communicated therethrough. While a trombone-like shape of exhaust port piping 810a-810j is shown, the thermal transfer of heat may be influenced by the size, shape, and length of exhaust port piping 810a-810j and the surface area that makes thermal contact with cone portion 820 of exhaust port 350c. One of ordinary skill in the art will recognize that the size, shape, and length of the plurality of exhaust port piping 810a-810j may vary based on an application or design in accordance with one or more embodiments of the present invention.

In certain embodiments, a wastewater manifold 340 may be disposed within the exhaust collector 300 of the turbine. The wastewater manifold 340 may fluidly connect the track outlet 365 of the wastewater heating track 375, 380, and 385 to the plurality of wastewater atomization nozzles 410a-410j via the corresponding plurality of exhaust port piping 810a-810j. A plurality of conduits 830a-830j may removably and fluidly connect wastewater manifold 340 to the plurality of exhaust port piping 810a-810j. The plurality of wastewater atomization nozzles 410a-410j may be removably attached to a distal end of the plurality of exhaust port piping 810a-810j and may be disposed within exhaust port 350c such that the tips of the nozzles 410a-410j direct atomized wastewater into the interior of exhaust port 350c. To facilitate transportability as part of a mobile wastewater evaporation system (e.g., 900 of FIG. 9A-9D), exhaust port 350c may be removably attached to exhaust collector 300. For example, exhaust port 350c may include a flange 840 that allows exhaust port 350c to be attached to exhaust collector 300 upon assembly and detached upon disassembly. The plurality of conduits 830a-830j facilitate removable fluid connectivity between wastewater manifold 340 and the plurality of exhaust port piping 810a-810j upon attaching exhaust port 350c to, or detaching exhaust 350c from, exhaust collector 300 on site.

Continuing, FIG. 8B shows a cross-sectional perspective view of a portion of an exhaust port 350c with a plurality of exhaust port piping 810a-810j disposed about an interior surface of the exhaust port 350c and turbine exhaust collector 300 in accordance with one or more embodiments of the present invention. The plurality of exhaust port piping 810a-810j may be in thermal contact with, or otherwise thermally coupled to, the interior surface of cone portion 820 of exhaust port 350c. Turbine exhaust from exhaust collector 300 may be discharged through exhaust port 350c. The temperature of the turbine exhaust within the exhaust port 350c may increase the temperature of the interior surface of cone portion 820 of exhaust port 350c and the plurality of exhaust port piping 810a-810j. In addition, the thermal coupling between the interior surface of cone portion 820 and the plurality of exhaust port piping 810a-810j may further increase the temperature of wastewater as it is being fluidly communicated through the plurality of exhaust port piping 810a-810j towards the plurality of wastewater atomization nozzles 410a-410j. The increased temperature of the wastewater may enhance atomization and increase the efficiency by which atomized wastewater is converted to steam within exhaust port 350c.

Continuing, FIG. 8C shows a cross-sectional view through an interior portion of an exhaust port 350c with a plurality of exhaust port piping 810a-810j disposed above an interior surface of the exhaust port 350c in accordance with one or more embodiments of the present invention. The placement of the plurality of wastewater atomization nozzles 410a-410j may be in a pattern that promotes conversion of atomized wastewater to steam within the exhaust port 350c. In the example depicted, a Fibonacci spiral-like pattern may be used to dispose wastewater atomization nozzles 410a-410j along the length of cone portion 820 of exhaust port 350c such that they direct atomized wastewater towards an interior surface of cone portion 820 rather than other atomization nozzles 410. Atomized wastewater may be converted to steam in the presence of turbine exhaust within exhaust port 350c. To the extent atomized wastewater is not converted to steam before making contact with cone portion 820, contact with cone portion 820 further increases the temperature of the atomized wastewater and further promotes increased conversion efficiency. One of ordinary skill in the art will recognize that any pattern that prevents atomization nozzles 410a-410j from directing atomized wastewater into the path of other atomization nozzles or atomized wastewater may be used in accordance with one or more embodiments of the present invention.

Figure 9A:
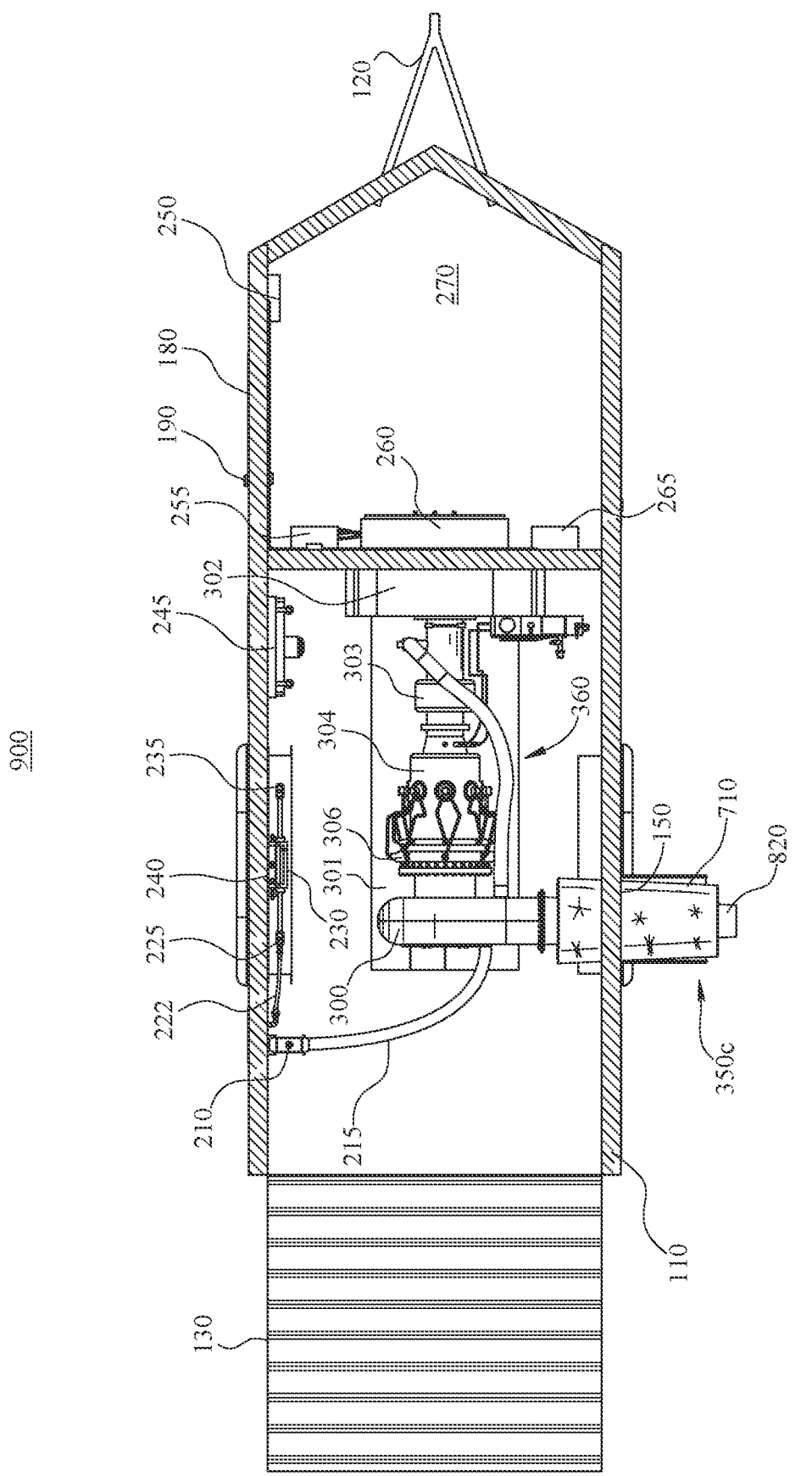
FIG. 9A shows a top interior plan view of a mobile wastewater evaporation system with an exhaust port with a plurality of exhaust port piping disposed about an interior surface of the exhaust port in accordance with one or more embodiments of the present invention.
Figure 9B:
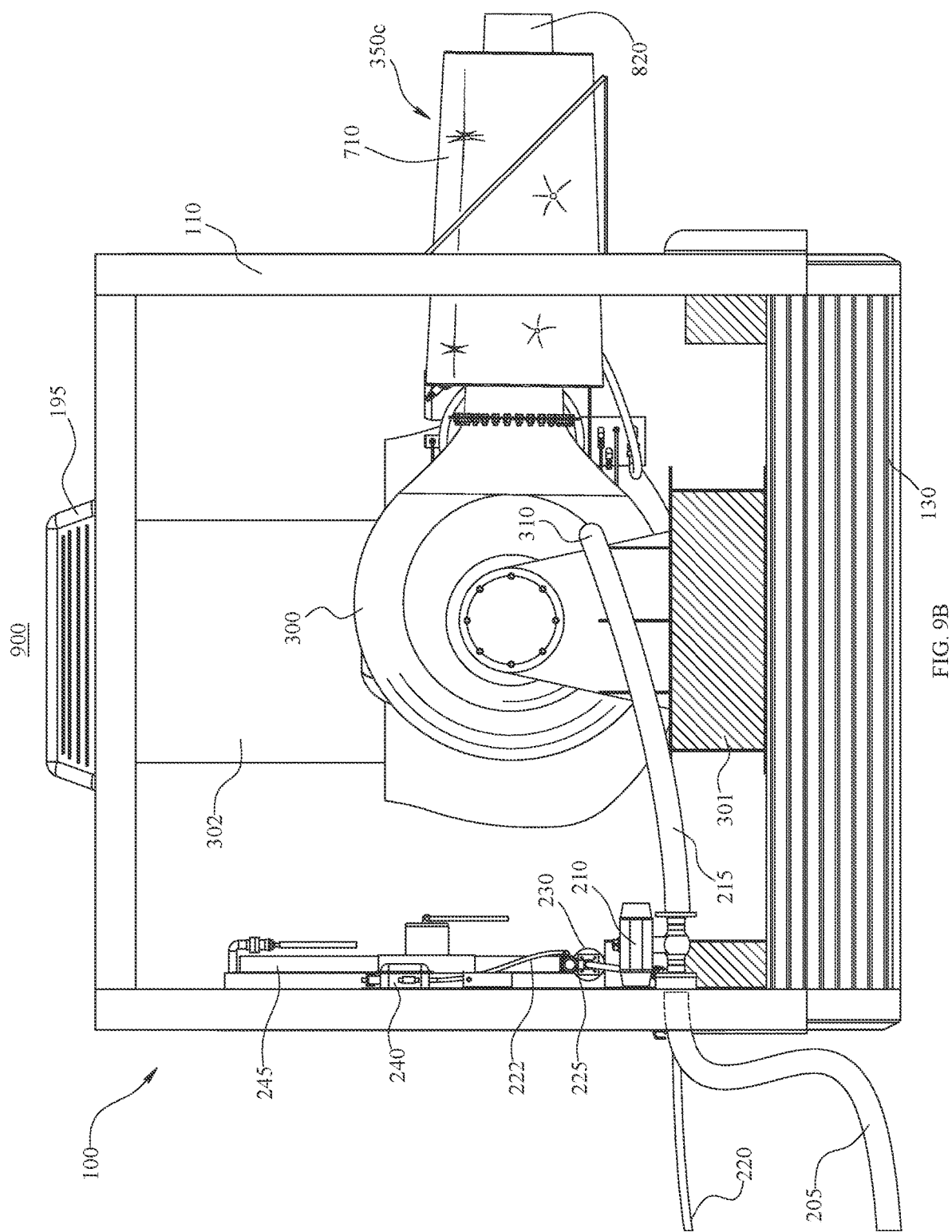
FIG. 9B shows a rear elevation view of a mobile wastewater evaporation system with an exhaust port with a plurality of exhaust port piping disposed about an interior surface of the exhaust port in accordance with one or more embodiments of the present invention.

FIG. 9A shows a top interior plan view of a mobile wastewater evaporation system 900 with an exhaust port 350c with a plurality of exhaust port piping (e.g., 810a-810j) disposed about an interior surface of the exhaust port 350c in accordance with one or more embodiments of the present invention. As noted above, the length of exhaust port 350c may require that the exhaust port 350c be transported in a detached state and attached to the turbine exhaust collector 300 on the job site. Once assembled, part of cone portion 820 of exhaust port 350c may extend beyond the wall of mobile trailer 110. In certain embodiments, a thermal blanket 710 may be wrapped around exhaust port 350c to retain as much heat as possible and further promote conversion efficiency. Continuing, FIG. 9B shows a rear elevation view of a mobile wastewater evaporation system 900 with an exhaust port 350c with a plurality of exhaust port piping (e.g., 810a-810j) disposed about an interior surface of the exhaust port 350c in accordance with one or more embodiments of the present invention.

Figure 9C:
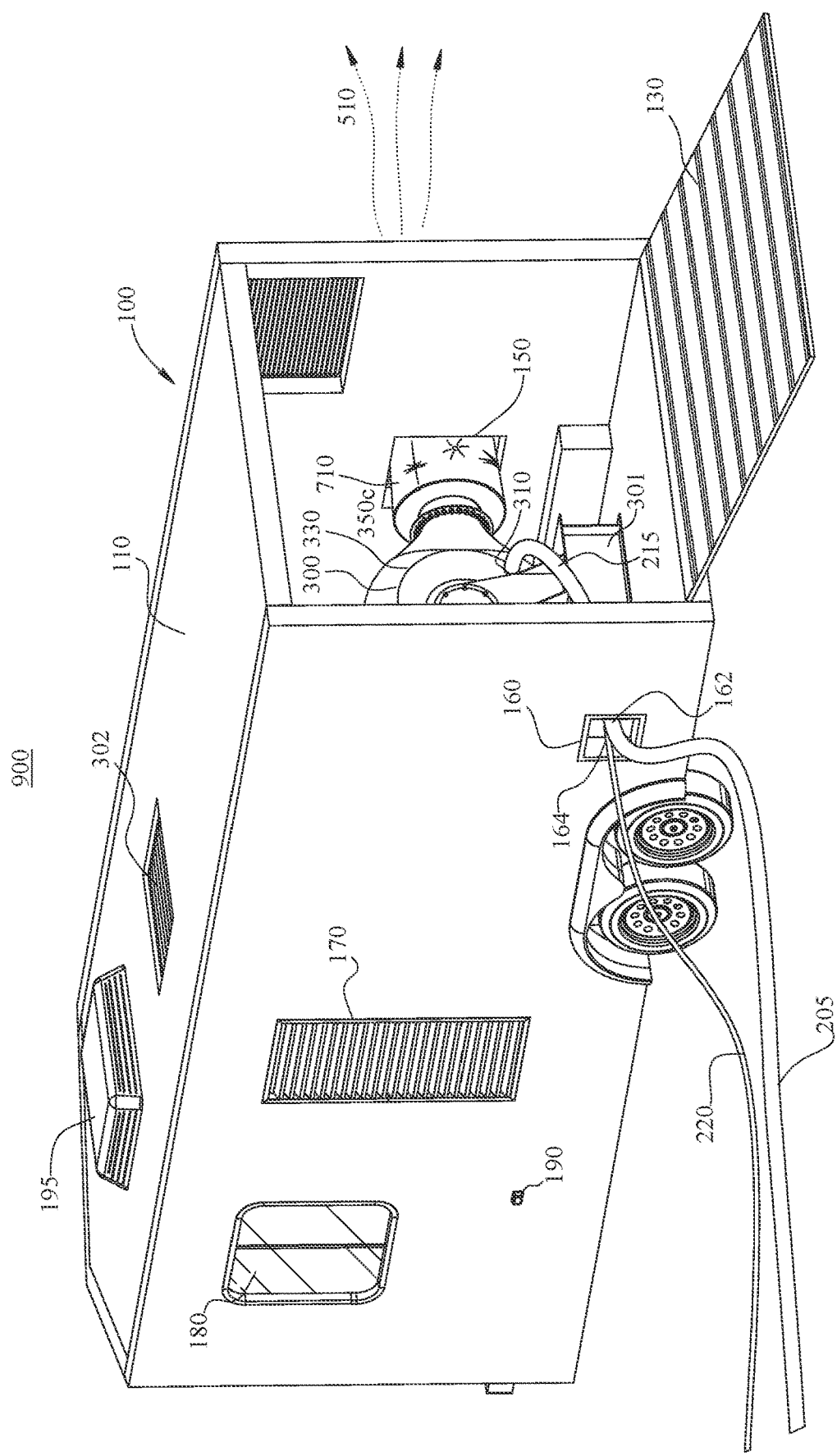
FIG. 9C shows a right-side rear-facing perspective view of a mobile wastewater evaporation system with an exhaust port with a plurality of exhaust port piping disposed about an interior surface of the exhaust port in operative use in accordance with one or more embodiments of the present invention.
Figure 9D:
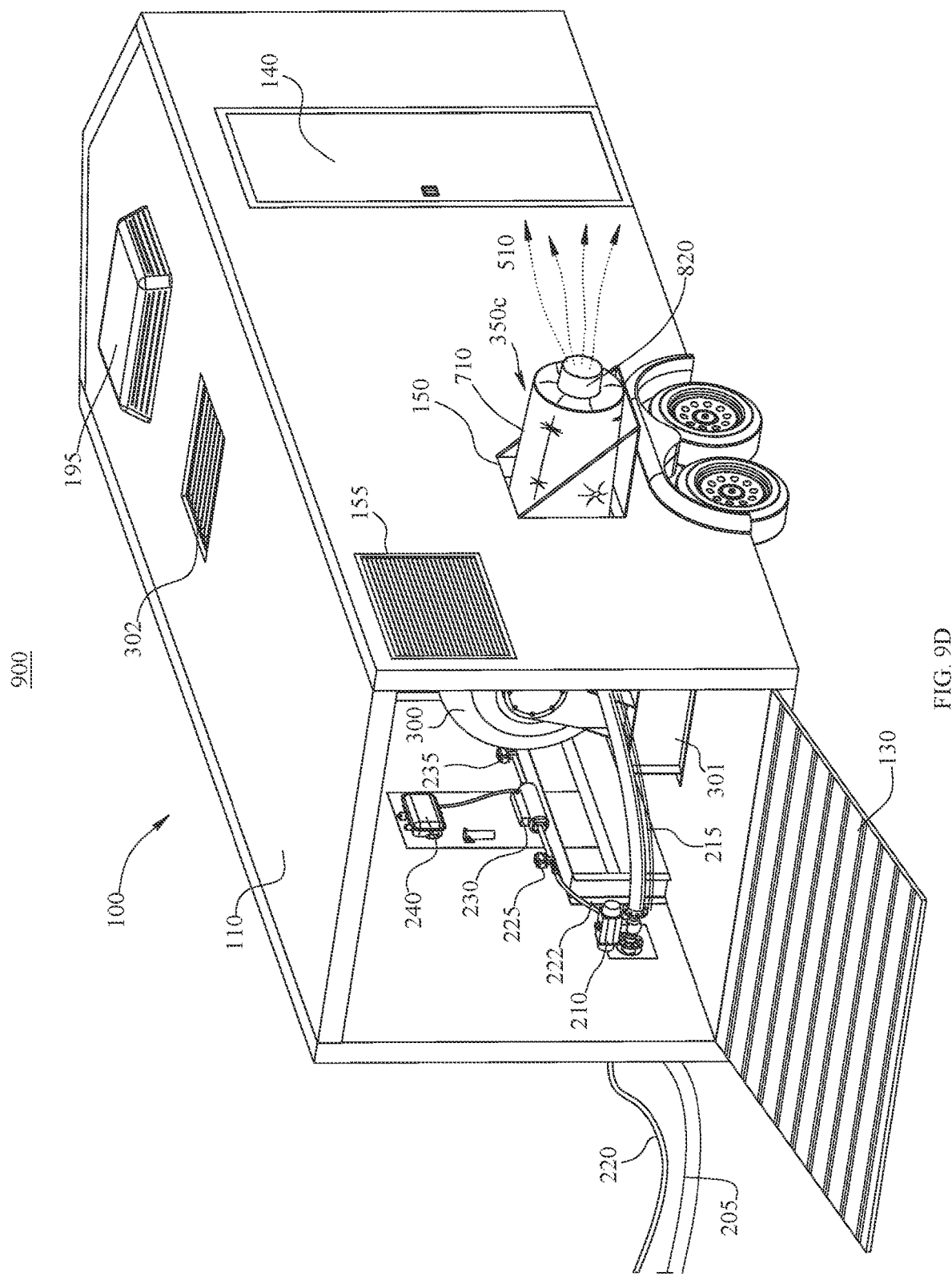
FIG. 9D shows a left-side rear-facing perspective view of a mobile wastewater evaporation system with an exhaust port with a plurality of exhaust port piping disposed about an interior surface of the exhaust port in operative use in accordance with one or more embodiments of the present invention.

Continuing, FIG. 9C shows a right-side rear-facing perspective view of a mobile wastewater evaporation system 900 with an exhaust port 350c with a plurality of exhaust port piping (e.g., 810a-810j) disposed about an interior surface of the exhaust port 350c in operative use in accordance with one or more embodiments of the present invention. Continuing, FIG. 9D shows a left-side rear-facing perspective view of a mobile wastewater evaporation system 900 with an exhaust port 350c with a plurality of exhaust port piping (e.g., 810a-810j) disposed about an interior surface of the exhaust port 350c in operative use in accordance with one or more embodiments of the present invention.

Figure 10:
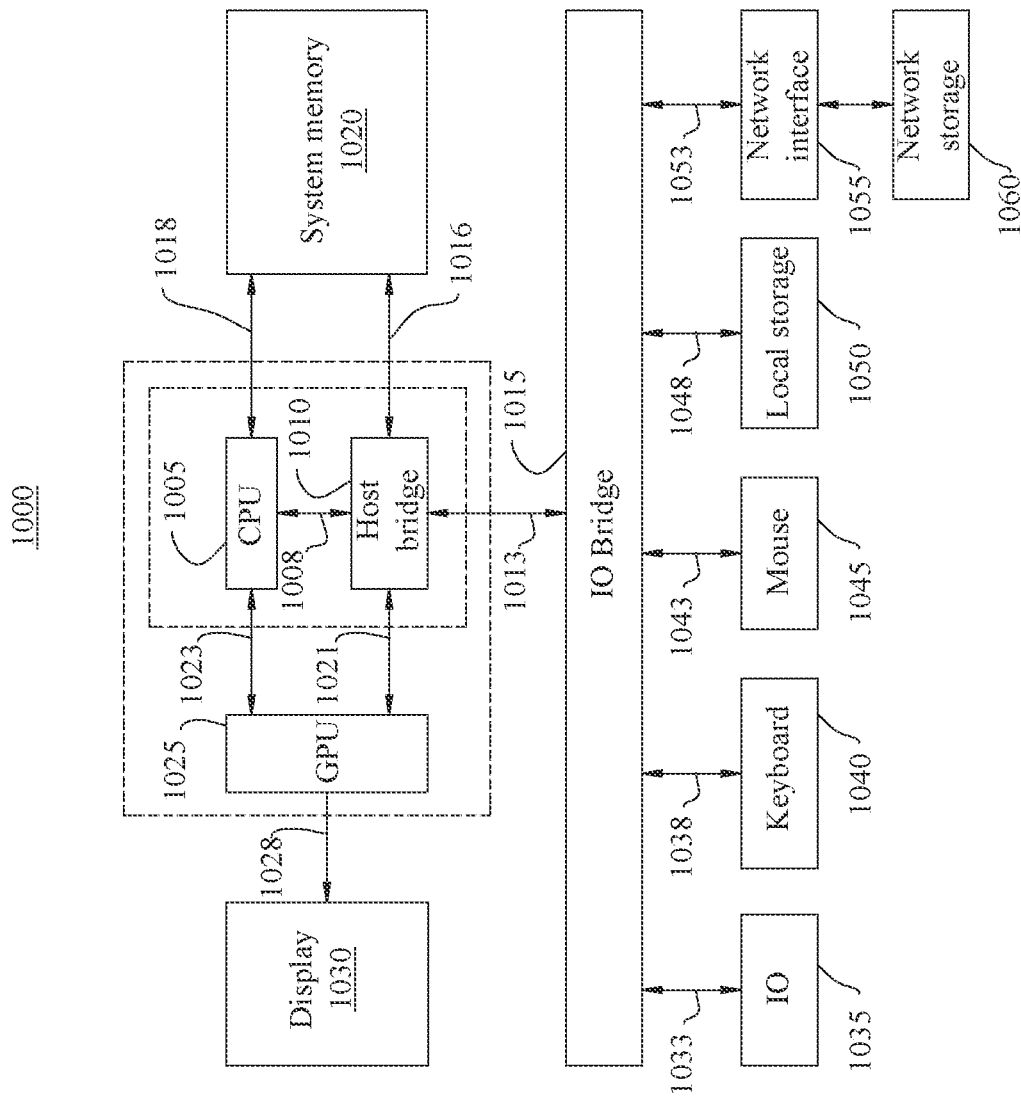
FIG. 10 shows an exemplary control system of a mobile wastewater evaporation system in accordance with one or more embodiments of the present invention.

FIG. 10 shows an exemplary computer or control system 1000 of a mobile wastewater evaporation system 100 in accordance with one or more embodiments of the present invention. Control system 1000 may control various aspects of a mobile wastewater evaporation system (e.g., 100), including, starting and stopping the turbine system (e.g., 360), controlling the wastewater inlet actuator (e.g., 210), controlling all aspects of the fuel system (e.g., 225, 230, 235, and 240) of the turbine system (e.g., 360), and controlling operational aspects of the turbine system (e.g., 360). Control system 1000 may include communication capabilities such as, for example, a network connection, a cellular network connection, or a satellite network connection. The communication capabilities may enable a remote operator, not located on site, to control various aspects of the mobile wastewater evaporation system (e.g., 100). As such, control system 1000 may vary from a simple PLC based system (e.g., 260, 265) to a more complex computing system as depicted in FIG. 10. Thus, the description of control system 1000 is merely exemplary and not intended to limit the type, kind, or configuration of component devices that constitute a control system 1000 in accordance with one or more embodiments of the present invention.

An exemplary control system 1000 may include one or more of Central Processing Unit ("CPU") 1005, host bridge 1010, Input/Output ("IO") bridge 1015, Graphics Processing Unit ("GPUs") 1025, Application-Specific Integrated Circuit ("ASIC") (not shown), and PLC (e.g., 260, 265) disposed on one or more printed circuit boards (not shown) that perform computational or logical operations. Each computational device may be a single-core device or a multi-core device. Multi-core devices typically include a plurality of cores (not shown) disposed on the same physical die (not shown) or a plurality of cores (not shown) disposed on multiple die (not shown) that are collectively disposed within the same mechanical package (not shown). CPU 1005 may be a general-purpose computational device that executes software instructions. CPU 1005 may include one or more of interface 1008 to host bridge 1010, interface 1018 to system memory 1020, and interface 1023 to one or more IO devices, such as, for example, one or more optional GPUs 1025. GPU 1025 may serve as a specialized computational device that typically performs graphics functions related to frame buffer manipulation. However, one of ordinary skill in the art will recognize that GPU 1025 may be used to perform non-graphics related functions that are computationally intensive. In certain embodiments, GPU 1025 may interface 1025 directly with CPU 1005 (and indirectly interface 1018 with system memory 1020 through CPU 1005). In other embodiments, GPU 1025 may interface 1021 directly with host bridge 1010 (and indirectly interface 1016 or 1018 with system memory 1020 through host bridge 1010 or CPU 1005 depending on the application or design). In still other embodiments, GPU 1025 may directly interface 1033 with IO bridge 1015 (and indirectly interface 1016 or 1018 with system memory 1020 through host bridge 1010 or CPU 1005 depending on the application or design). One of ordinary skill in the art will recognize that GPU 1025 includes on-board memory as well. In certain embodiments, the functionality of GPU 1025 may be integrated, in whole or in part, with CPU 1005 and/or host bridge 1010, if included at all.

Host bridge 1010 may be an interface device that interfaces between the one or more computational devices and IO bridge 1015 and, in some embodiments, system memory 1020. Host bridge 1010 may include interface 1008 to CPU 1005, interface 1013 to IO bridge 1015, for embodiments where CPU 1005 does not include interface 1018 to system memory 1020, interface 1016 to system memory 1020, and for embodiments where CPU 1005 does not include an integrated GPU 1025 or interface 1023 to GPU 1025, interface 1021 to GPU 1025. The functionality of host bridge 1010 may be integrated, in whole or in part, with CPU 1005 and/or GPU 1025. IO bridge 1015 may be an interface device that interfaces between the one or more computational devices and various IO devices (e.g., 1040, 1045) and IO expansion, or add-on, devices (not independently illustrated). IO bridge 1015 may include interface 1013 to host bridge 1010, one or more interfaces 1033 to one or more IO expansion devices 1035, interface 1038 to optional keyboard 1040, interface 1043 to optional mouse 1045, interface 1048 to one or more local storage devices 1050, and interface 1053 to one or more optional network interface devices 1055. The functionality of IO bridge 1015 may be integrated, in whole or in part, with CPU 1005, host bridge 1010, and/or GPU 1025. Each local storage device 1050, if any, may be a solid-state memory device, a solid-state memory device array, a hard disk drive, a hard disk drive array, or any other non-transitory computer readable medium. An optional network interface device 1055 may provide one or more network interfaces including any network protocol suitable to facilitate networked communications. Control system 1000 may include one or more optional network-attached storage devices 1060 in addition to, or instead of, one or more local storage devices 1050. Each network-attached storage device 1060, if any, may be a solid-state memory device, a solid-state memory device array, a hard disk drive, a hard disk drive array, or any other non-transitory computer readable medium. Network-attached storage device 1060 may or may not be collocated with control system 1000 and may be accessible to control system 1000 via one or more network interfaces provided by one or more network interface devices 1055.

One of ordinary skill in the art will recognize that control system 1000 may be a conventional computing system such as that depicted in FIG. 10 or an application-specific computing system (not shown) configured for industrial applications, such as a PLC based system (e.g., 260, 265). In certain embodiments, an application-specific computing system (not shown) may include one or more ASICs (not shown) or PLCs (e.g., 260, 265) that perform one or more specialized functions in a more efficient manner. The one or more ASICs (not shown) or PLCs (e.g., 260, 265) may interface directly with CPU 1005, host bridge 1010, or GPU 1025 or interface through I0 bridge 1015. Alternatively, in other embodiments, an application-specific computing system (not shown) may represent a reduced number of components that are necessary to perform a desired function or functions in an effort to reduce one or more of chip count, printed circuit board footprint, thermal design power, and power consumption. In such embodiments, the one or more ASICs (not shown) and/or PLCs (e.g., 260, 265) may be used instead of one or more of CPU 1005, host bridge 1010, IO bridge 1015, or GPU 1025, and may execute software instructions. In such systems, the one or more ASICs (not shown) or PLCs or (e.g., 260, 265) may incorporate sufficient functionality to perform certain network, computational, or logical functions in a minimal footprint with substantially fewer component devices.

As such, one of ordinary skill in the art will recognize that CPU 1005, host bridge 1010, I0 bridge 1015, GPU 1025, ASIC (not shown), or PLC (not shown) or a subset, superset, or combination of functions or features thereof, may be integrated, distributed, or excluded, in whole or in part, based on an application, design, or form factor in accordance with one or more embodiments of the present invention. Thus, the description of control system 1000 is merely exemplary and not intended to limit the type, kind, or configuration of component devices that constitute a control system 1000 suitable for performing computing operations in accordance with one or more embodiments of the present invention.

In one or more embodiments of the present invention, a method of wastewater evaporation using a turbine may include fluidly communicating wastewater to a track inlet of a wastewater heating track disposed within an interior of an exhaust collector of the turbine, where the wastewater is heated by turbine exhaust in the interior of the exhaust collector while being fluidly communicated by the wastewater heating track to a track outlet from the wastewater heating track and fluidly communicating the heated wastewater from the track outlet to a plurality of wastewater atomization nozzles that direct atomized wastewater into an interior of an exhaust port of the turbine. The atomized wastewater may be converted into steam in the presence of turbine exhaust. The track outlet may fluidly communicate wastewater to a wastewater manifold disposed outside of the exhaust collector that fluidly communicates the wastewater to the plurality of wastewater atomization nozzles. The wastewater heating track may include a plurality of wastewater pipe segments that fluidly connect the wastewater heating track inlet to the wastewater heating track outlet. The wastewater heating track may be disposed within the interior of the exhaust collector of the turbine in a flow path of turbine exhaust that surrounds the wastewater heating track. A plurality of conduits may fluidly connect the wastewater manifold to the plurality of wastewater atomization nozzles. The plurality of wastewater atomization nozzles may be at least partially disposed within the exhaust port of the turbine. The plurality of wastewater atomization nozzles may be arranged in a pattern that directs atomized wastewater into the interior of the exhaust port of the turbine.

In one or more embodiments of the present invention, a system for wastewater evaporation may include a turbine having an exhaust collector and an exhaust port, a wastewater heating track disposed within an interior of the exhaust collector, where a track inlet to the wastewater heating track receives wastewater that is heated by turbine exhaust in the interior of the exhaust collector while being fluidly communicated by the wastewater heating track to a track outlet from the wastewater heating track, and a plurality of wastewater atomization nozzles that atomize wastewater from the wastewater heating track into an interior of the exhaust port. The atomized wastewater may be converted to steam in the presence of turbine exhaust in the exhaust port of the turbine. A wastewater manifold may fluidly connect the track outlet to the exhaust port via the plurality of wastewater atomization nozzles. The wastewater heating track may include a plurality of wastewater pipe segments that fluidly connect the wastewater heating track inlet to the wastewater heating track outlet. The wastewater heating track may be disposed within the interior of the exhaust collector of the turbine in a flow path of turbine exhaust that surrounds the wastewater heating track. A plurality of conduits may fluidly connect the wastewater manifold to the plurality of wastewater atomization nozzles. The plurality of wastewater atomization nozzles may be at least partially disposed within the exhaust port of the turbine. The plurality of wastewater atomization nozzles may be arranged in a pattern that directs atomized wastewater into the interior of the exhaust port of the turbine.

In one or more embodiments of the present invention, a mobile wastewater evaporation system includes a mobile trailer having an exterior wastewater inlet connector, a turbine having an exhaust collector disposed within the mobile trailer and an exhaust port configured to convey turbine exhaust out of an exhaust window of the mobile trailer, a wastewater heating track disposed within an interior of the exhaust collector, where a track inlet to the wastewater heating track receives wastewater that is heated by turbine exhaust in the interior of the exhaust collector while being fluidly communicated by the wastewater heating track to a track outlet from the wastewater heating track, a plurality of wastewater atomization nozzles that direct atomized wastewater into an interior of the exhaust port, where the atomized wastewater is converted to steam in the presence of turbine exhaust in the exhaust port of the turbine, and a control system that controls operation of the turbine. A wastewater manifold may fluidly connect the track outlet to the exhaust port via the plurality of wastewater atomization nozzles. The wastewater heating track may include a plurality of wastewater heating pipes that fluidly connect the wastewater heating track inlet to the wastewater heating track outlet. The wastewater heating track may be disposed within the interior of the exhaust collector of the turbine in a flow path of turbine exhaust that surrounds the wastewater heating track. A plurality of conduits may fluidly connect the wastewater manifold to the plurality of wastewater atomization nozzles. The plurality of wastewater atomization nozzles may be at least partially disposed within the exhaust port of the turbine. The plurality of wastewater atomization nozzles may be arranged in a pattern that directs atomized wastewater into the interior of the exhaust port of the turbine. The control system may be configured to start or stop the turbine. The control system may be remotely controllable.

In one or more embodiments of the present invention, a method of wastewater evaporation using a turbine may include fluidly communicating wastewater through a wastewater heating track disposed within an interior of an exhaust collector of the turbine and fluidly communicating the wastewater from the wastewater heating track to a plurality of wastewater atomization nozzles disposed at least partially within an interior of an exhaust port of the turbine. The wastewater heating track may include a track inlet, a track outlet, and one or more wastewater pipe segments that fluidly connect the track inlet to the track outlet. The wastewater heating track may be disposed in a flow path of turbine exhaust within the interior of the exhaust collector. Wastewater may be heated by turbine exhaust in the interior of the exhaust collector while being fluidly communicated by the wastewater heating track. The wastewater atomization nozzles may direct atomized wastewater into the interior of the exhaust port. The atomized wastewater may be converted into steam in the presence of turbine exhaust within the exhaust port.

In certain embodiments, wastewater may be fluidly communicated from the wastewater heating track to the plurality of wastewater atomization nozzles via a wastewater manifold. In such embodiments, a plurality of conduits may fluidly connect the wastewater manifold to the plurality of wastewater atomization nozzles. The plurality of wastewater atomization nozzles may be at least partially disposed within the interior of the exhaust port.

In other embodiments, wastewater may be fluidly communicated from the wastewater heating track to the plurality of wastewater atomization nozzles via a wastewater manifold that is fluidly connected to a plurality of exhaust port piping that are fluidly connected to the plurality of wastewater atomization nozzles. In such embodiments, the plurality of exhaust port piping may be coupled to an exterior surface of the exhaust port and a plurality of conduits may fluidly connect the wastewater manifold to the plurality of exhaust port piping. The plurality of wastewater atomization nozzles may be at least partially disposed within the interior of the exhaust port.

In still other embodiments, wastewater may be fluidly communicated from the wastewater heating track to the plurality of wastewater atomization nozzles via a wastewater manifold that is fluidly connected to a plurality of exhaust port piping that are fluidly connected to the plurality of wastewater atomization nozzles. In such embodiments, the wastewater manifold may be disposed within the interior of the exhaust collector, the plurality of exhaust port piping may be coupled to an interior surface of the exhaust port, and a plurality of conduits may fluidly connect the wastewater manifold to the plurality of exhaust port piping. The plurality of wastewater atomization nozzles may be disposed within the interior of the exhaust port.

In certain embodiments, the plurality of wastewater atomization nozzles may be arranged in a pattern that directs atomized wastewater into the interior of the exhaust port. In certain embodiments, the plurality of wastewater atomization nozzles may be arranged in a Fibonacci spiral-like pattern that directs atomized wastewater into the interior of the exhaust port.

In one or more embodiments of the present invention, a wastewater evaporation system may include a turbine having an exhaust collector and an exhaust port, a wastewater heating track having a track inlet, a track outlet, and one or more wastewater pipe segments that fluidly connect the track inlet to the track outlet, and a plurality of wastewater atomization nozzles fluidly connected to the track outlet of the wastewater heating track that are at least partially disposed within an interior of the exhaust port of the turbine. The wastewater heating track may be disposed within an interior of the exhaust collector of the turbine. The wastewater heating track may be disposed in a flow path of turbine exhaust within the interior of the exhaust collector. Wastewater may be heated by turbine exhaust in the interior of the exhaust collector while being fluidly communicated by the wastewater heating track. The wastewater atomization nozzles may direct atomized wastewater into the interior of the exhaust port. The atomized wastewater may be converted into steam in the presence of turbine exhaust within the exhaust port.

In certain embodiments, a wastewater manifold may fluidly connect the track outlet of the wastewater heating track to the plurality of wastewater atomization nozzles. A plurality of conduits may fluidly connect the wastewater manifold to the plurality of wastewater atomization nozzles. The plurality of wastewater atomization nozzles may be at least partially disposed within the interior of the exhaust port.

In other embodiments, a wastewater manifold may be disposed outside of the exhaust collector and may fluidly connect the track outlet of the wastewater heating track to a plurality of exhaust port piping that are fluidly connected to the plurality of wastewater atomization nozzles. In such embodiments, the plurality of exhaust port piping may be coupled to an exterior surface of the exhaust port. A plurality of conduits may fluidly connect the wastewater manifold to the plurality of exhaust port piping. The plurality of wastewater atomization nozzles may be at least partially disposed within the interior of the exhaust port.

In still other embodiments, a wastewater manifold may be disposed within the interior of the exhaust collector and may fluidly connect the track outlet of the wastewater heating track to a plurality of exhaust port piping that are fluidly connected to the plurality of wastewater atomization nozzles. In such embodiments, the plurality of exhaust port piping may be coupled to an interior surface of the exhaust port. A plurality of conduits may fluidly connect the wastewater manifold to the plurality of exhaust port piping. The plurality of wastewater atomization nozzles may be disposed within the interior of the exhaust port.

In certain embodiments, the plurality of wastewater atomization nozzles may be arranged in a pattern that directs atomized wastewater into the interior of the exhaust port. In certain embodiments, the plurality of wastewater atomization nozzles may be arranged in a Fibonacci spiral-like pattern that directs atomized wastewater into the interior of the exhaust port.

In one or more embodiments of the present invention, a wastewater evaporation system may include a mobile trailer, a turbine having an exhaust collector and an exhaust port, a wastewater heating track having a track inlet, a track outlet, and one or more wastewater pipe segments that fluidly connect the track inlet to the track outlet, a plurality of wastewater atomization nozzles fluidly connected to the track outlet of the wastewater heating track that are at least partially disposed within an interior of the exhaust port of the turbine, and a control system that controls operation of the turbine. The wastewater heating track may be disposed within an interior of the exhaust collector of the turbine. The wastewater heating track may be disposed in a flow path of turbine exhaust within the interior of the exhaust collector. Wastewater may be heated by turbine exhaust in the interior of the exhaust collector while being fluidly communicated by the wastewater heating track. The wastewater atomization nozzles may direct atomized wastewater into the interior of the exhaust port. The atomized wastewater may be converted into steam in the presence of turbine exhaust within the exhaust port.

In certain embodiments, a wastewater manifold may fluidly connect the track outlet of the wastewater heating track to the plurality of wastewater atomization nozzles. A plurality of conduits may fluidly connect the wastewater manifold to the plurality of wastewater atomization nozzles. The plurality of wastewater atomization nozzles may be at least partially disposed within the interior of the exhaust port.

In other embodiments, a wastewater manifold may be disposed outside of the exhaust collector and may fluidly connect the track outlet of the wastewater heating track to a plurality of exhaust port piping that are fluidly connected to the plurality of wastewater atomization nozzles. In such embodiments, the plurality of exhaust port piping may be coupled to an exterior surface of the exhaust port. A plurality of conduits may fluidly connect the wastewater manifold to the plurality of exhaust port piping. The plurality of wastewater atomization nozzles may be at least partially disposed within the interior of the exhaust port.

In still other embodiments, a wastewater manifold may be disposed within the interior of the exhaust collector and may fluidly connect the track outlet of the wastewater heating track to a plurality of exhaust port piping that are fluidly connected to the plurality of wastewater atomization nozzles. In such embodiments, the plurality of exhaust port piping may be coupled to an interior surface of the exhaust port. A plurality of conduits may fluidly connect the wastewater manifold to the plurality of exhaust port piping. The plurality of wastewater atomization nozzles may be disposed within the interior of the exhaust port.

In certain embodiments, the plurality of wastewater atomization nozzles may be arranged in a pattern that directs atomized wastewater into the interior of the exhaust port. In certain embodiments, the plurality of wastewater atomization nozzles may be arranged in a Fibonacci spiral-like pattern that directs atomized wastewater into the interior of the exhaust port.

In certain embodiments, the control system may be configured to start or stop the turbine or other any other equipment constituting the mobile wastewater evaporation system. In certain embodiments, the control system may include communications capabilities that allow the mobile wastewater evaporation system to be controlled remotely.

Advantages of one or more embodiments of the present invention may include one or more of the following:

In one or more embodiments of the present invention, a method and system of wastewater evaporation enables disposal of wastewater on-site at or very near the location where the wastewater is actually produced. The produced wastewater may be conveyed directly or via an intermediate holding area to a wastewater evaporation system for evaporation of the wastewater on site.

In one or more embodiments of the present invention, a method and system of wastewater evaporation may be remotely controlled such that the wastewater evaporation system may be turned on or off remotely by a person located off-site. The wastewater evaporation system may include a communication system and a control system that enable remote control of all necessary components to engage or disengage the operation of the wastewater evaporation system.

In one or more embodiments of the present invention, a method and system of wastewater evaporation does not require on-site personnel to operate the wastewater evaporation system. Personnel are not exposed to wastewater or the high temperature steam generated by the wastewater evaporation system. Advantageously, the safety of operations is increased.

In one or more embodiments of the present invention, a method and system of wastewater evaporation enables the on-site disposal of approximately 100,000 gallons of wastewater per light industrial turbine per day.

In one or more embodiments of the present invention, a method and system of wastewater evaporation may be powered by flare gas generated from fracking, drilling, or production operations on the site where the wastewater evaporation system is deployed to dispose of wastewater.

In one or more embodiments of the present invention, a method and system of wastewater evaporation may have a wastewater-to-steam conversion efficiency rating of 95 percent or more.

In one or more embodiments of the present invention, a method and system of wastewater evaporation substantially reduces costs associated with wastewater disposal.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should only be limited by the appended claims.

What is claimed is:

1. A method of wastewater evaporation using a turbine comprising:
   fluidly communicating wastewater through a wastewater heating track disposed within an interior of an exhaust collector of the turbine, wherein the wastewater heating track is surrounded by turbine exhaust that heats wastewater while it is being fluidly communicated; and
   fluidly communicating the wastewater from the wastewater heating track to a plurality of wastewater atomization nozzles at least partially disposed within an interior of an exhaust port of the turbine, wherein the wastewater atomization nozzles atomize the wastewater being fluidly communicated and direct atomized wastewater into the interior of the exhaust port,
   wherein the atomized wastewater is converted into steam in the presence of turbine exhaust within the exhaust port.

2. The method of claim 1, wherein the wastewater is fluidly communicated from the wastewater heating track to the plurality of wastewater atomization nozzles via a wastewater manifold.

3. The method of claim 2, wherein a plurality of conduits fluidly connect the wastewater manifold to the plurality of wastewater atomization nozzles.

4. The method of claim 1, wherein the wastewater is fluidly communicated from the wastewater heating track to the plurality of wastewater atomization nozzles via a wastewater manifold fluidly connected to a plurality of exhaust port piping fluidly connected to the plurality of wastewater atomization nozzles.

5. The method of claim 4, wherein the plurality of exhaust port piping is coupled to an exterior surface of the exhaust port.

6. The method of claim 4, wherein the plurality of exhaust port piping is coupled to an interior surface of the exhaust port.

7. The method of claim 4, wherein a plurality of conduits fluidly connect the wastewater manifold to the plurality of exhaust port piping.

8. The method of claim 4, wherein the wastewater manifold is disposed within the interior of the exhaust collector.

9. The method of claim 1, wherein the wastewater heating track comprises a track inlet, a track outlet, and one or more wastewater pipe segments that fluidly connect the track inlet to the track outlet.

10. The method of claim 1, wherein the wastewater heating track is disposed in a flow path of turbine exhaust within the interior of the exhaust collector.

11. The method of claim 1, wherein the plurality of wastewater atomization nozzles are disposed within the interior of the exhaust port.

12. The method of claim 1, wherein the plurality of wastewater atomization nozzles are arranged in a spiral-like pattern that directs atomized wastewater into the interior of the exhaust port.

13. A wastewater evaporation system comprising:
   a turbine comprising an exhaust collector and an exhaust port;
   a wastewater heating track disposed within an interior of the exhaust collector of the turbine, the wastewater heating track comprising a track inlet, a track outlet, and one or more wastewater pipe segments that fluidly connect the track inlet to the track outlet; and
   a plurality of wastewater atomization nozzles at least partially disposed within an interior of the exhaust port of the turbine that are fluidly connected to the track outlet of the wastewater heating track,
   wherein the wastewater heating track is surrounded by turbine exhaust within the interior of the exhaust collector that heats the wastewater being fluidly communicated therethrough, wherein the plurality of wastewater atomization nozzles atomize the wastewater being fluidly communicated and direct the atomized wastewater into the interior of the exhaust port, and wherein the atomized wastewater is converted into steam in the presence of the turbine exhaust within the exhaust port.

14. The system of claim 13, further comprising a wastewater manifold that fluidly connects the track outlet of the wastewater heating track to the plurality of wastewater atomization nozzles.

15. The system of claim 14, wherein a plurality of conduits fluidly connect the wastewater manifold to the plurality of wastewater atomization nozzles.

16. The system of claim 13, further comprising a wastewater manifold that fluidly connects the track outlet of the wastewater heating track to a plurality of exhaust port piping that are fluidly connected to the plurality of wastewater atomization nozzles.

17. The system of claim 16, wherein the plurality of exhaust port piping is coupled to an exterior surface of the exhaust port.

18. The system of claim 16, wherein the plurality of exhaust port piping is coupled to an interior surface of the exhaust port.

19. The system of claim 16, wherein a plurality of conduits fluidly connect the wastewater manifold to the plurality of exhaust port piping.

20. The system of claim 16, wherein the wastewater manifold is disposed within the interior of the exhaust collector.

21. The system of claim 13 wherein the wastewater heating track is disposed in a flow path of turbine exhaust within the interior of the exhaust collector.

22. The system of claim 13, wherein the wastewater manifold is disposed outside of the exhaust collector.

23. The system of claim 13, wherein the plurality of wastewater atomization nozzles are disposed within the interior of the exhaust port.

24. The system of claim 13, wherein the plurality of wastewater atomization nozzles are arranged in a spiral-like pattern that directs atomized wastewater into the interior of the exhaust port.

25. A mobile wastewater evaporation system comprising:
a mobile trailer;
a turbine comprising an exhaust collector and an exhaust port;
a wastewater heating track disposed within an interior of the exhaust collector of the turbine, the wastewater heating track comprising a track inlet, a track outlet, and one or more wastewater pipe segments that fluidly connect the track inlet to the track outlet;
a plurality of wastewater atomization nozzles at least partially disposed within an interior of the exhaust port of the turbine that are fluidly connected to the track outlet of the wastewater heating track that are at least partially disposed within an interior of the exhaust port of the turbine; and
a control system that controls operation of the turbine,
wherein the wastewater heating track is surrounded by turbine exhaust within the interior of the exhaust collector that heats the wastewater being fluidly communicated therethrough,
wherein the plurality of wastewater atomization nozzles atomize the wastewater being fluidly communicated and direct the atomized wastewater into the interior of the exhaust port, and
wherein the atomized wastewater is converted into steam in the presence of the turbine exhaust within the exhaust port.

26. The system of claim 25, further comprising a wastewater manifold that fluidly connects the track outlet of the wastewater heating track to the plurality of wastewater atomization nozzles.

27. The system of claim 26, wherein a plurality of conduits fluidly connect the wastewater manifold to the plurality of wastewater atomization nozzles.

28. The system of claim 25, further comprising a wastewater manifold that fluidly connects the track outlet of the wastewater heating track to a plurality of exhaust port piping that are fluidly connected to the plurality of wastewater atomization nozzles.

29. The system of claim 28, wherein the plurality of exhaust port piping is coupled to an exterior surface of the exhaust port.

30. The system of claim 28, wherein the plurality of exhaust port piping is coupled to an interior surface of the exhaust port.

31. The system of claim 28, wherein a plurality of conduits fluidly connect the wastewater manifold to the plurality of exhaust port piping.

32. The system of claim 28, wherein the wastewater manifold is disposed within the interior of the exhaust collector.

33. The system of claim 25, wherein the wastewater heating track is disposed in a flow path of turbine exhaust within the interior of the exhaust collector.

34. The system of claim 25, wherein the wastewater manifold is disposed outside of the exhaust collector.

35. The system of claim 25, wherein the plurality of wastewater atomization nozzles are disposed within the interior of the exhaust port.

36. The system of claim 25, wherein the plurality of wastewater atomization nozzles are arranged in a spiral-like pattern that directs atomized wastewater into the interior of the exhaust port.

37. The system of claim 25, wherein the control system is configured to start or stop the turbine.

38. The system of claim 25, wherein the control system is remotely controllable.

* * * * *